US012798274B2

(12) United States Patent

Kitajima et al.

(10) Patent No.: US 12,798,274 B2
(45) Date of Patent: Nov. 17, 2026

(54) IMAGE FORMING APPARATUS

(71) Applicant: CANON KABUSHIKI KAISHA, Tokyo (JP)

(72) Inventors: Tomoharu Kitajima, Ibaraki (JP); Shimpei Kakizaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 18/795,573

(22) Filed: Aug. 6, 2024

(65) Prior Publication Data

US 2025/0108644 A1 Apr. 3, 2025

(30) Foreign Application Priority Data

Sep. 29, 2023 (JP) ................................ 2023-170078

(51) Int. Cl.
*B41J 29/02* (2006.01)
*B41J 29/13* (2006.01)
*H04N 1/00* (2006.01)

(52) U.S. Cl.
CPC ............... *B41J 29/02* (2013.01); *B41J 29/13* (2013.01); *H04N 1/00551* (2013.01); *H04N 2201/03133* (2013.01)

(58) Field of Classification Search
None
See application file for complete search history.

(56) References Cited

U.S. PATENT DOCUMENTS 5,137,385 A 8/1992 Kamimura et al.
5,875,714 A * 3/1999 Winkler .............. B41F 33/0018 101/216

(Continued)

FOREIGN PATENT DOCUMENTS

JP 2016215522 A 12/2016
JP 2019130709 A 8/2019

(Continued)

OTHER PUBLICATIONS

Yamashita , Machine TranslationofJP-2023086428-A, 2023 (Year: 2023).*

(Continued)

*Primary Examiner* — Scott A Richmond
(74) *Attorney, Agent, or Firm* — ROSSI, KIMMS & McDOWELL LLP

(57) ABSTRACT

An image forming apparatus includes: a recording portion configured to a sheet to form an image; a conveyance portion facing the recording portion in a vertical direction and configured to convey the sheet in a first direction orthogonal to the vertical direction; a body frame configured to support the recording portion and the conveyance portion; and an exterior cover disposed on a front side of the recording portion in a front-rear direction orthogonal to the vertical direction and the first direction and attached to the body frame, in which the exterior cover includes a transparent cover formed of a transparent material, and a cover frame disposed on at least a part of a periphery of the transparent cover, and the exterior cover is configured to rotate around a rotation axis on an upper end side of the exterior cover to be opened and closed.

40 Claims, 21 Drawing Sheets

(56) References Cited

U.S. PATENT DOCUMENTS

| | | | | |
|---|---|---|---|---|
| 2003/0156850 | A1 * | 8/2003 | Tsutada | G03G 15/6573 399/45 |
| 2005/0140704 | A1 * | 6/2005 | Mitsunaga | B41J 11/008 347/5 |
| 2006/0244802 | A1 * | 11/2006 | Chen | B41J 11/006 347/108 |
| 2014/0232795 | A1 | 8/2014 | Yanagishita | |
| 2023/0055676 | A1 | 2/2023 | Iizuka | |
| 2023/0114709 | A1 * | 4/2023 | Fujii | B41J 29/38 101/494 |
| 2024/0003177 | A1 * | 1/2024 | Li | E05F 11/04 |

FOREIGN PATENT DOCUMENTS

| | | | | |
|---|---|---|---|---|
| JP | 2020151999 | A | | 9/2020 |
| JP | 2023030253 | A | | 3/2023 |
| JP | 2023057266 | A | | 4/2023 |
| JP | 2023086428 | A | * | 6/2023 |

OTHER PUBLICATIONS

Extended European Search Report issued in European Appln. No. 24193786.1, mailed Jan. 20, 2025.
Office Action issued in European Appln. No. 24193786.1, mailed on Jul. 20, 2026.

* cited by examiner

IMAGE FORMING APPARATUS

BACKGROUND OF THE INVENTION

Field of the Invention

The present invention relates to an image forming apparatus such as a printer, a copying machine, or a printer that performs image formation using an ink jet method.

Description of the Related Art

In the industrial printing industry, it is desired that an operator can visually check an operating state of an image forming apparatus. As a large-sized ink jet printer, an image forming apparatus in which a scanning state of an ink ejection head can be visually checked has been provided. Similarly, as a label printer, an image forming apparatus in which an operating state can be visually checked is put on the market.

In the case of such image forming apparatuses, the height of the apparatus body is generally smaller than the height of a person. A configuration in which a recording portion of the image forming apparatus is not covered with an exterior cover may be adopted to enable visual checking of the operating state in such image forming apparatuses. Alternatively, a configuration in which an exterior cover is provided on a front surface of the image forming apparatus and a transparent window is disposed at a part of the exterior cover may be adopted. Further, a configuration in which an illumination is provided inside the image forming apparatus to improve visibility (Japanese Patent Application Laid-Open No. 2016-215522) may also be adopted.

As a commercial printer for a cut sheet/flat sheet, a printer in which a recording portion is visible is put on the market. Such printers are relatively larger than the large-sized ink jet printer or label printer and have a height of about 2 m, and a door serving as an exterior cover is generally horizontally opened (double door).

However, in the related art, since the door provided on the front surface of the image forming apparatus is horizontally opened, when maintenance work for the image forming apparatus is performed by opening the door, a work space may be limited by the opened door. For example, in a case where the maintenance work is performed by opening double hinged doors and pulling out a unit such as the recording portion in the apparatus to the front of the apparatus, the work space is narrowed because of the opened doors positioned on the sides of the pulled out unit. In addition, the opened doors may block a movement path of the operator. Therefore, improvement of operability is desired.

In the configuration in which the transparent window is disposed at a part of the exterior cover, a range in which the operating state can be visually checked is limited. Even when the transparent window is provided in each of the double hinged doors, a seam between the doors becomes a blind spot, and thus, the range in which the operating state can be visually checked is limited. Therefore, improvement of operability is desired.

SUMMARY OF THE INVENTION

According to a representative configuration of the present invention, an image forming apparatus includes: a recording portion configured to eject ink onto a sheet to form an image; a conveyance portion facing the recording portion in a vertical direction and configured to convey the sheet in a first direction orthogonal to the vertical direction; a body frame configured to support the recording portion and the conveyance portion; and an exterior cover disposed on a front side of the recording portion in a front-rear direction orthogonal to the vertical direction and the first direction and attached to the body frame so as to form a front exterior, in which the exterior cover includes a transparent cover formed of a transparent material, and a cover frame disposed on at least a part of a periphery of the transparent cover, and the exterior cover is configured to rotate around a rotation axis on an upper end side of the exterior cover to be opened and closed.

Further features of the present invention will become apparent from the following description of exemplary embodiments with reference to the attached drawings.

DESCRIPTION OF THE EMBODIMENTS

Figure 1:
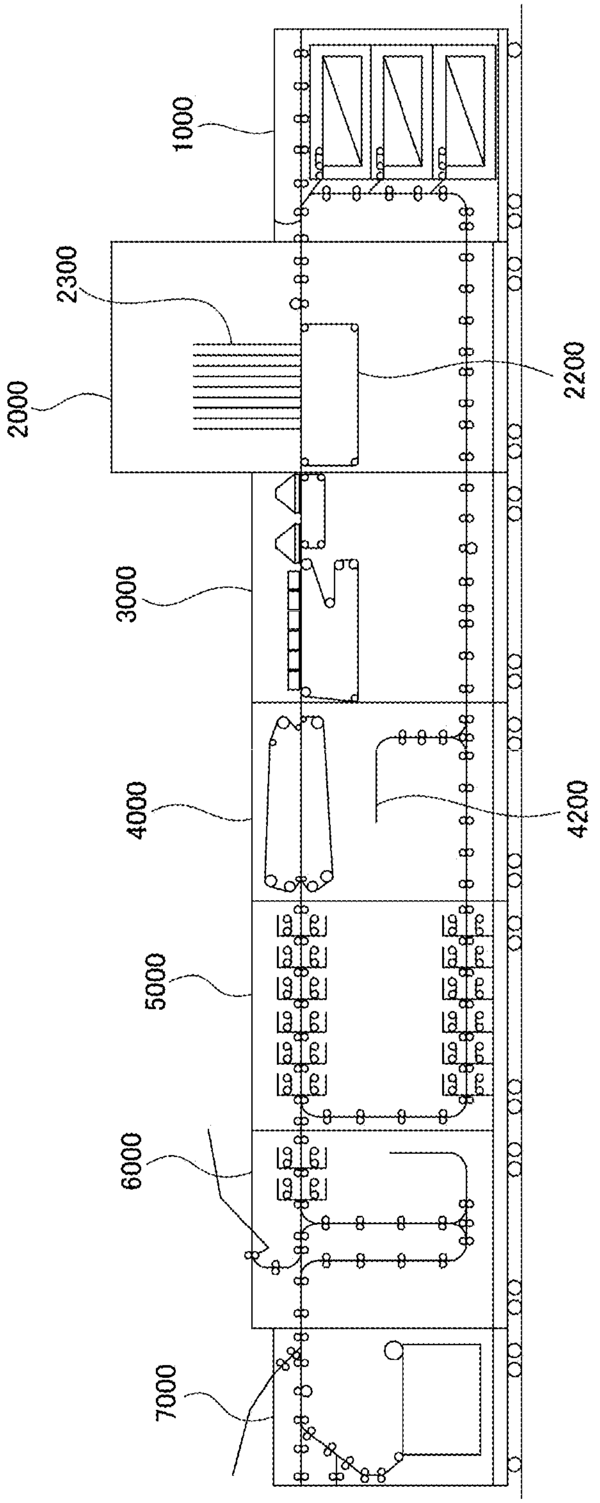
FIG. 1 is a schematic cross-sectional view illustrating a schematic configuration of an image forming apparatus.

Hereinafter, an embodiment of an image forming apparatus according to the present invention will be specifically described with reference to the drawings. Note that dimensions, materials, relative positions, and the like of components of the image forming apparatus described below do not limit the scope of the present invention unless otherwise specified. In addition, components denoted by the same reference numerals in the respective drawings have the same configuration or function, and an overlapping description thereof will be appropriately omitted.

<Image Forming Apparatus>

A schematic configuration of the image forming apparatus will be described with reference to FIG. 1. FIG. 1 is a schematic view illustrating the configuration of the image forming apparatus. The image forming apparatus illustrated in FIG. 1 is an example of an ink jet image forming apparatus that performs image formation using an ink jet method.

In the image forming apparatus, processing is executed on a paper sheet (recording medium) fed from a sheet feeding module 1000 in the order of a print module 2000, a drying module 3000, a fixing module 4000, a cooling module 5000, a reversing module 6000, and a discharged sheet stacking module 7000. An image is formed on the paper sheet fed from the sheet feeding module 1000 by the print module 2000. The drying module 3000 is a unit that reduces a liquid content in ink to improve fixability between the paper sheet and the ink, and the fixing module 4000 heats the paper sheet to soften the applied ink. The paper sheet fixed by the cooling module 5000 is cooled to solidify the softened ink, and a change in paper sheet temperature downstream of the cooling module is suppressed. The reversing module 6000 adjusts an orientation of the paper sheet to a desired orientation. The discharged sheet stacking module 7000 aligns and stacks printed paper sheets.

At the time of duplex printing, the paper sheet is conveyed by the cooling module 5000 so as to be returned toward the print module, and front and back sides of the paper sheet and front and rear sides of the paper sheet are changed by a reversing device 4200 provided in the fixing module 4000. Thereafter, the paper sheet is conveyed again to the print module 2000 through a duplex conveying path of the drying module 3000 and the sheet feeding module 1000 and is subjected to back surface printing.

As described above, the image forming apparatus includes the print module 2000 serving as a first module including a recording portion 2300 and a print belt unit 2200. The image forming apparatus further includes second modules (1000, 3000, 4000, 5000, 6000, and 7000) that are connected adjacent to one or both of left and right sides of the print module 2000 in a left-right direction and have functions different from that of the print module 2000. The left-right direction in the present embodiment is a sheet conveying direction when the image formation is performed. The sheet conveying direction may be referred to as a first direction. That is, in the present embodiment, the first direction is the left-right direction. In the embodiment, the right side in the left-right direction corresponds to an upstream side in the conveying direction, and the left side in the left-right direction corresponds to a downstream side in the conveying direction.

Here, a configuration in which the image forming apparatus is formed by connecting modules having different functions to both sides of the print module 2000 in the left-right direction has been exemplified, but the present invention is not limited thereto. The image forming apparatus may have a configuration in which modules having different functions are connected to the left side of the print module 2000 in the left-right direction. Alternatively, the image forming apparatus may have a configuration in which modules having different functions are connected to the right side of the print module 2000 in the left-right direction.

<Print Module>

Figure 2:
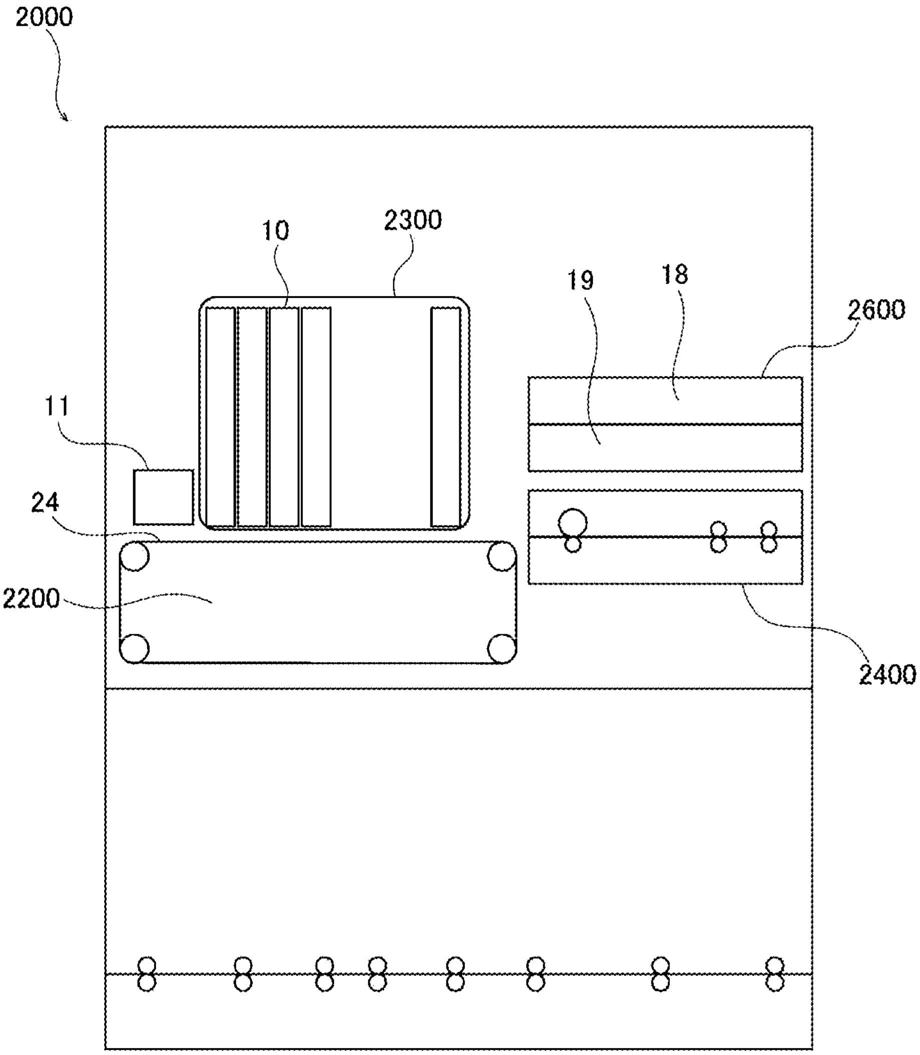
FIG. 2 is a schematic cross-sectional view of a print module.

A configuration of the print module 2000 will be described with reference to FIG. 2. FIG. 2 is a schematic cross-sectional view of the print module 2000.

The print module 2000 is an image forming portion that executes recording processing on the paper sheet (recording medium) serving as a conveyed sheet by using a recording head 10 from above to form an image on the paper sheet. The print module 2000 includes a pre-image formation registration correction portion 2400, the print belt unit 2200 serving as a conveyance portion, the recording portion 2300, a maintenance portion 2600, and a scanner unit 11. The paper sheet is sucked and conveyed by the print belt unit 2200, whereby a clearance with the recording head is secured.

The paper sheet conveyed from the sheet feeding module 1000 is conveyed to the print belt unit 2200 after an inclination and a position of the paper sheet are corrected by the pre-image formation registration correction portion 2400. The recording portion 2300 is disposed at a position facing the print belt unit 2200 across a conveyance path. The recording portion 2300 executes the recording processing (printing) on the paper sheet serving as the conveyed sheet by using the recording head 10 from above to form an image on the paper sheet. In the conveyance of the paper sheet in the recording portion 2300, the print belt unit 2200 that attracts and conveys the paper sheet is disposed to stabilize a paper sheet conveyance behavior immediately below the recording head 10. In the print belt unit 2200, the paper sheet conveyed on a paper sheet conveyance surface 24, which is a sheet conveyance surface, is conveyed in a state in which the clearance is secured with respect to the recording head 10. The recording head 10 performs the image formation by ejecting the ink onto the conveyed paper sheet at an ejection timing. A plurality of recording heads 10 is arranged in the conveying direction. In this example, a total of five line type recording heads corresponding to a reaction liquid in addition to four colors of yellow (Y), magenta (M), cyan (C), and black (Bk) are provided.

The scanner unit 11 is installed downstream of the recording head 10 in the conveying direction. The scanner unit 11 inspects the image immediately after the ink application by reading the sheet and the image on the conveyance surface 24 of the print belt unit 2200. When an image defect such as an ink ejection failure due to an ink ejection hole being blocked is detected, the apparatus is immediately stopped to minimize generation of a defective product. The scanner unit 11 is a unit (reading portion) that not only detects an ink ejection state but also reads the image formed on the paper sheet by the recording portion during printing, detects a deviation or density of the image, and corrects printing.

The maintenance portion 2600 is disposed on a right side of the recording portion 2300. The recording head 10 of the recording portion 2300 can be lifted and lowered, and may move to an upper retracted position (see FIG. 6) in a vertical direction as necessary. The maintenance portion 2600 moves to a position directly below the recording head 10 at the retracted position to perform maintenance of the recording portion 2300 (recording head 10).

The maintenance portion 2600 includes a cap tray 18 in which a capping mechanism (not illustrated) for protecting the ink ejection surface of the recording head 10 is disposed. The maintenance portion 2600 includes a cleaning tray 19 in which a cleaning mechanism (not illustrated) for recovering ejection performance of the recording head 10 is disposed. The maintenance portion 2600 is a two-layer unit including the cap tray 18 in an upper stage and the cleaning tray 19 in a lower stage. The ink ejection surface is an ejection port surface (nozzle surface) on which a plurality of ejection ports that ejects the ink in the recording head 10 is arranged.

When the operation of the apparatus is stopped, the cap tray 18 is directly below the recording portion 2300, and the recording head 10 lands on and is capped by the capping mechanism (not illustrated) in the cap tray, thereby preventing the ink ejection surface of the recording head 10 from being dried. In response to a print start command by a controller (not illustrated), the recording head 10 is first lifted to the retracted position and separated from the cap tray 18, then the cap tray 18 retracts to a retracted position, and then the recording head 10 is lowered to a printing position and performs a printing operation. In response to a print end command, the recording head 10 is lifted to the retracted position. Thereafter, when the cap tray 18 moves from the retracted position to the position directly below the recording portion 2300, the recording head 10 is lowered, lands on the cap tray, is capped, and is then stopped.

Even during printing, when a predetermined continuous operation time is reached, a cleaning command is issued from the controller (not illustrated). In response to the cleaning command, the recording head 10 is lifted to the retracted position, and then, the cleaning tray 19 in the lower stage of the maintenance portion 2600 moves to the position directly below the recording portion 2300. Thereafter, the recording head 10 is lowered and lands on the cleaning tray 19, and a cleaning operation such as wiping or vacuuming is performed. After the cleaning ends, the recording head 10 is lifted to the retracted position, the cleaning tray 19 is moved from the position immediately below the recording portion 2300 to a retracted position, and the recording head 10 is lowered to the printing position to resume printing. In a case where the printing is not resumed after the cleaning ends, the recording head 10 is lifted to the retracted position after the cleaning ends, the cleaning tray 19 is moved from the position directly below the recording portion 2300 to the retracted position, and the cap tray 18 is moved from the retracted position to the position directly below the recording portion 2300. Then, the recording head 10 is lowered, lands on the cap tray 18, is capped, and is then stopped. Head cleaning during the printing operation may be performed after printing processing for the paper sheet circulating in the apparatus is completed and new paper sheet supply is stopped. Alternatively, the head cleaning during the printing operation may be performed by temporarily stopping the operation in a state in which there is a paper sheet being circulated.

Note that the number of colors and the number of recording heads in the image forming apparatus are not limited to five. Further, a method using a heat generating element, a method using a piezoelectric element, a method using an electrostatic element, a method using a MEMS element, and the like can be adopted as the ink jet method.

<Configuration of Recording Portion>

Figure 3:
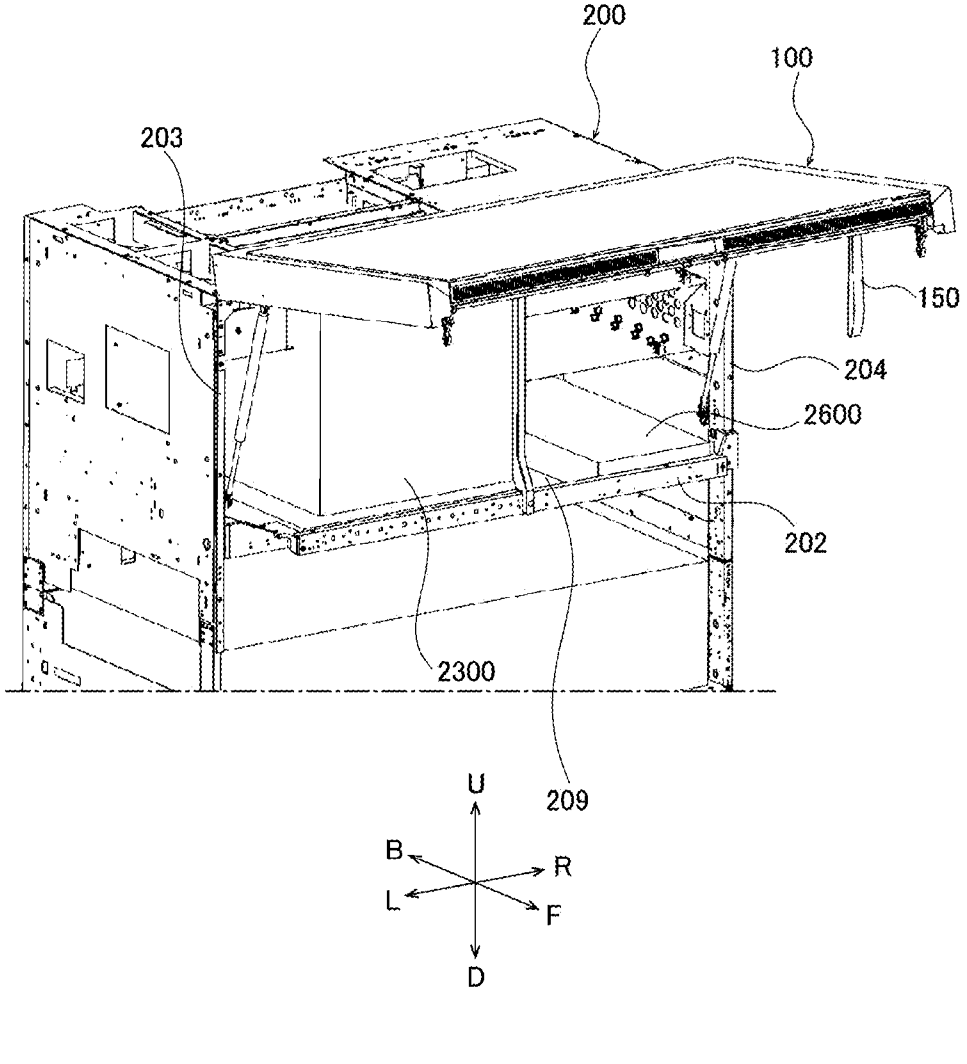
FIG. 3 is a schematic view of the print module with a front door opened when viewed from the front.
Figure 4:
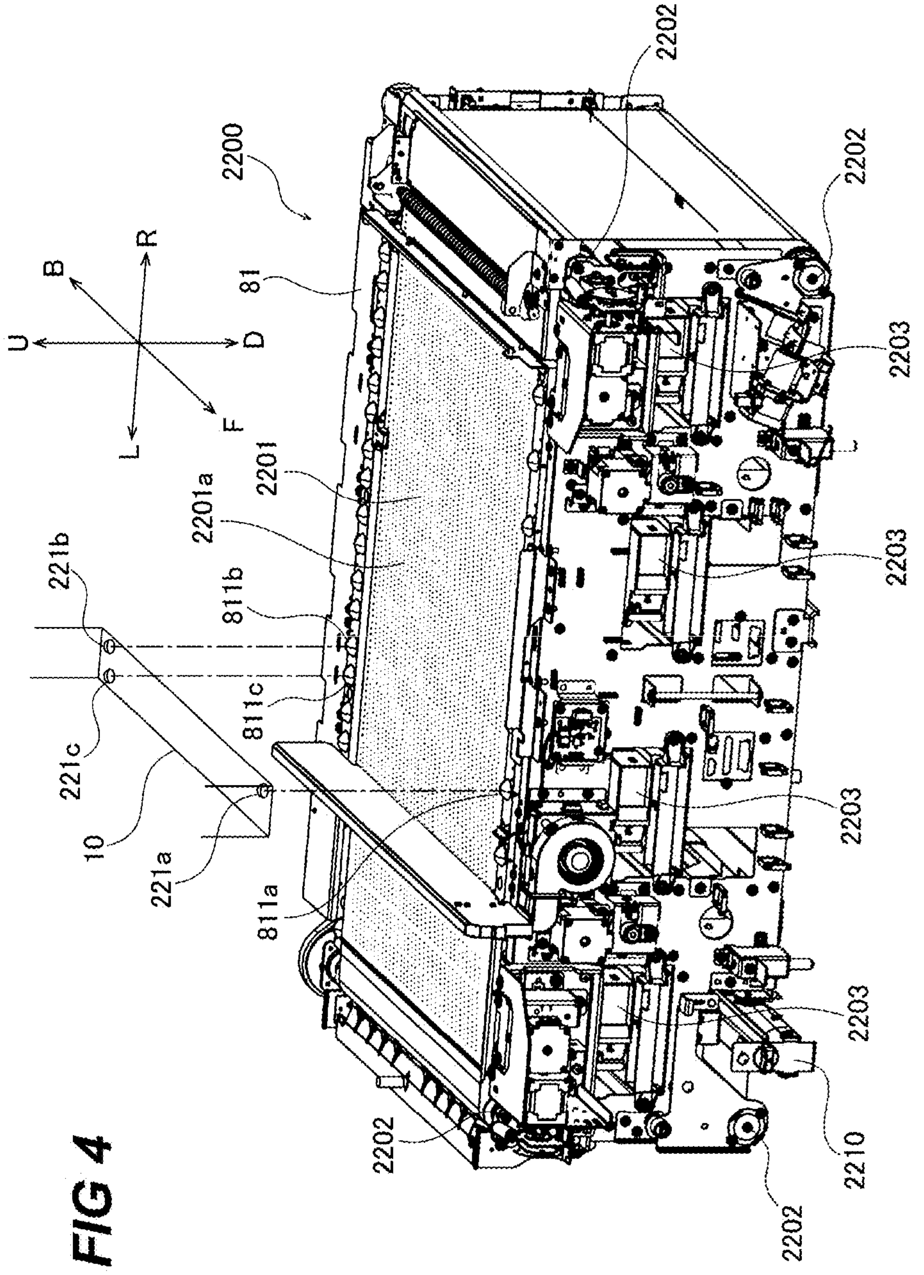
FIG. 4 is a perspective view of a print belt unit.
Figure 5:
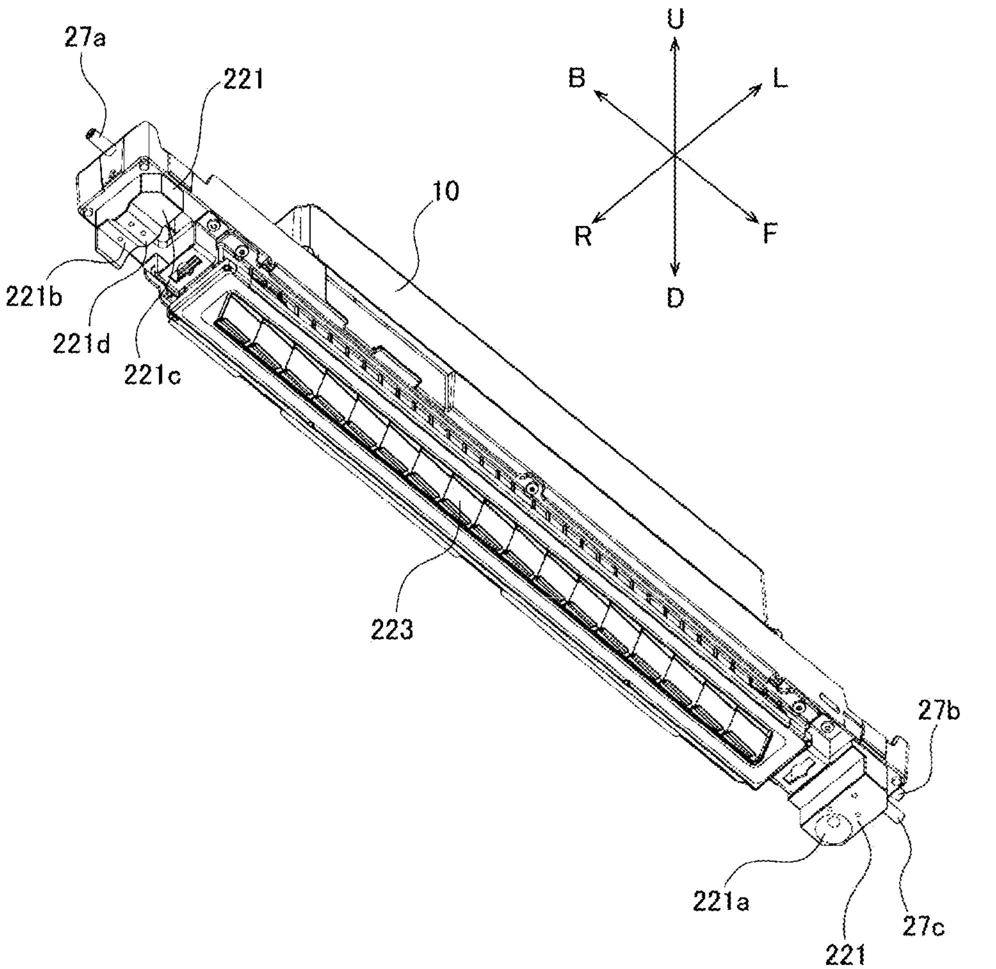
FIG. 5 is a perspective view of a recording head when viewed from an ink ejection surface direction.
Figure 6:
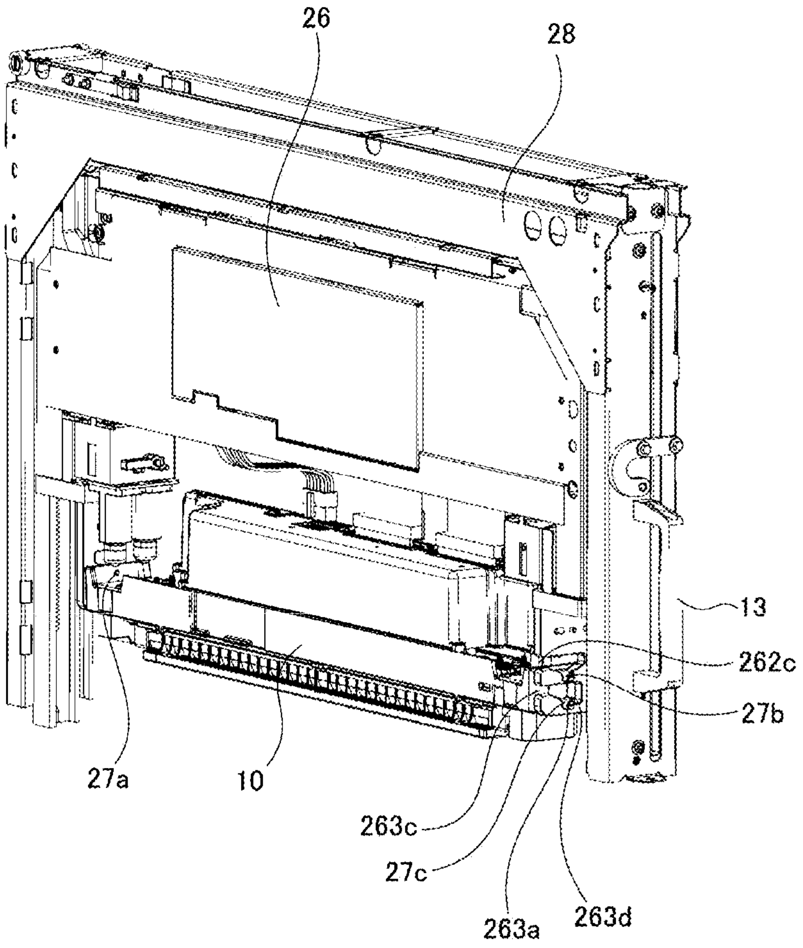
FIG. 6 is a perspective view illustrating a retracted position of the recording head.
Figure 7:
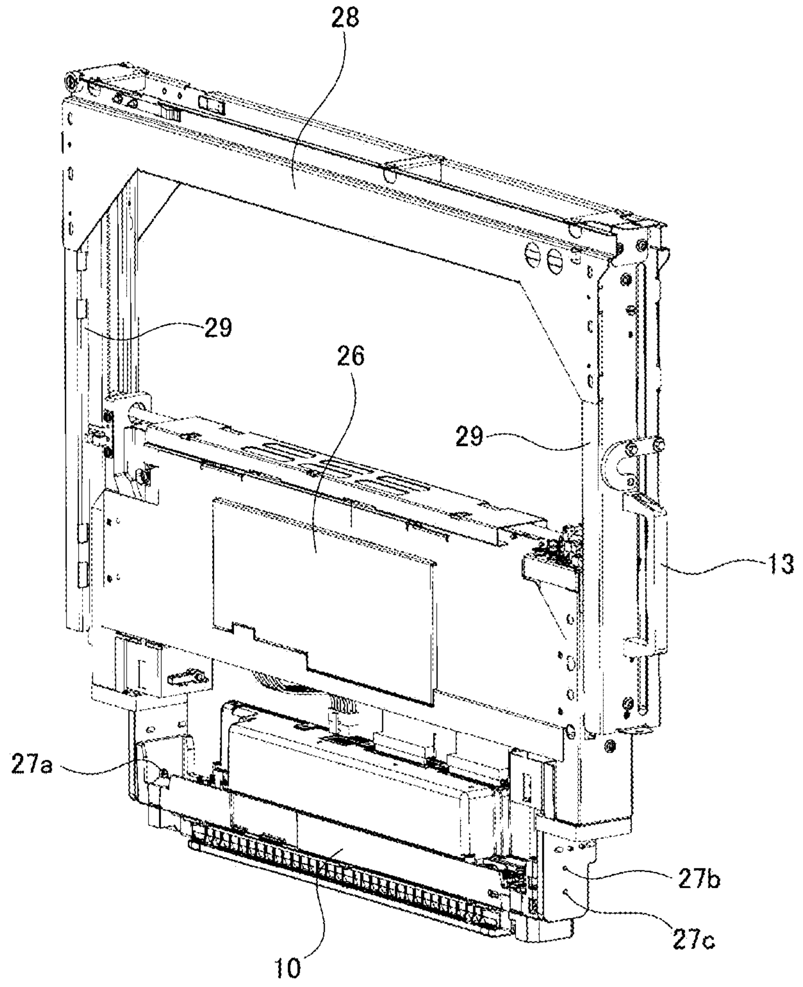
FIG. 7 is a perspective view illustrating a printing position of the recording head.
Figure 9A:
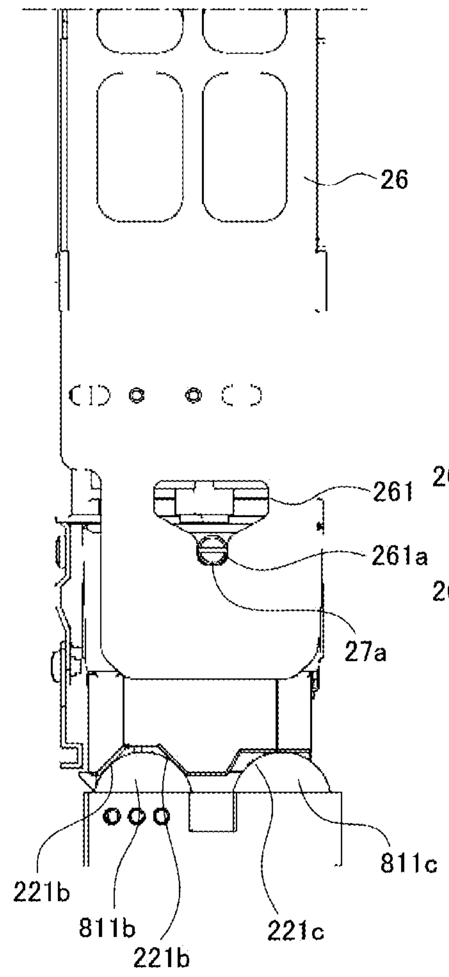
FIGS. 9A and 9B are views for describing movement of the recording head to the printing position.
Figure 9B:
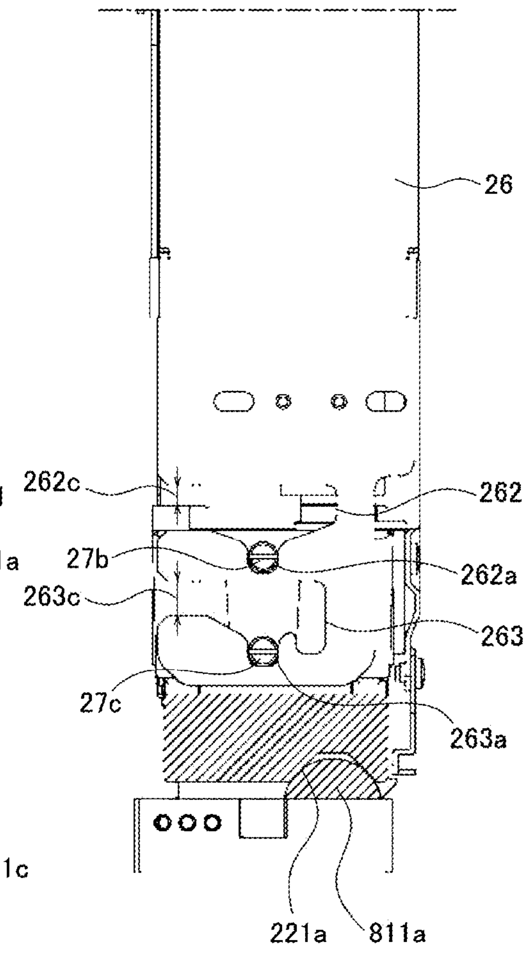
Figure 10A:
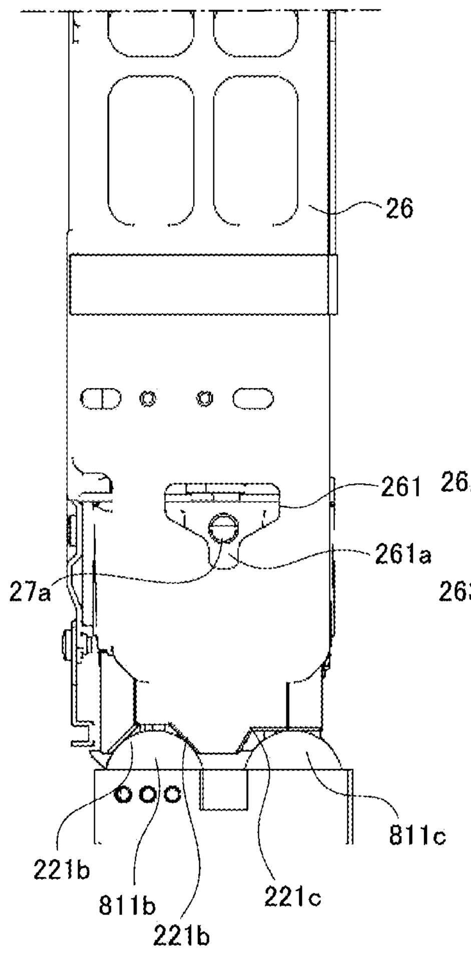
FIGS. 10A and 10B are views for describing movement of the recording head to the printing position.
Figure 10B:
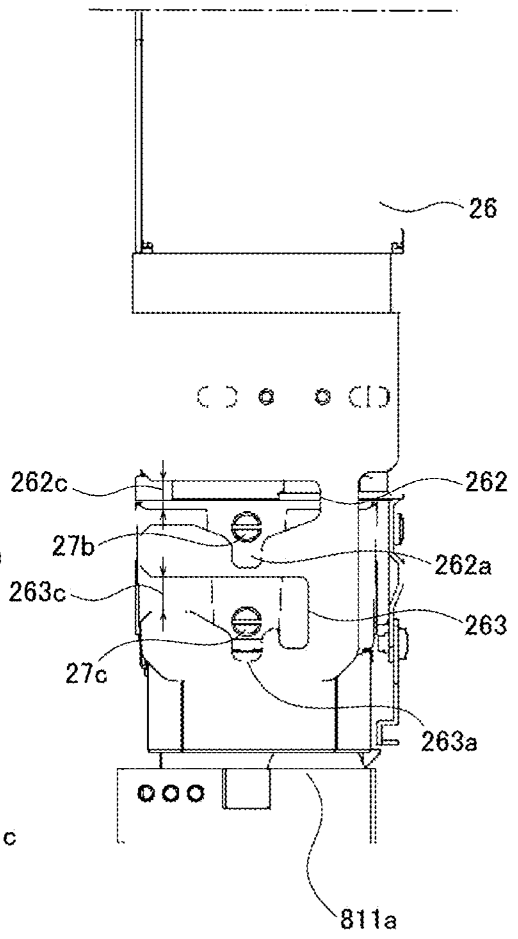
Figure 11:
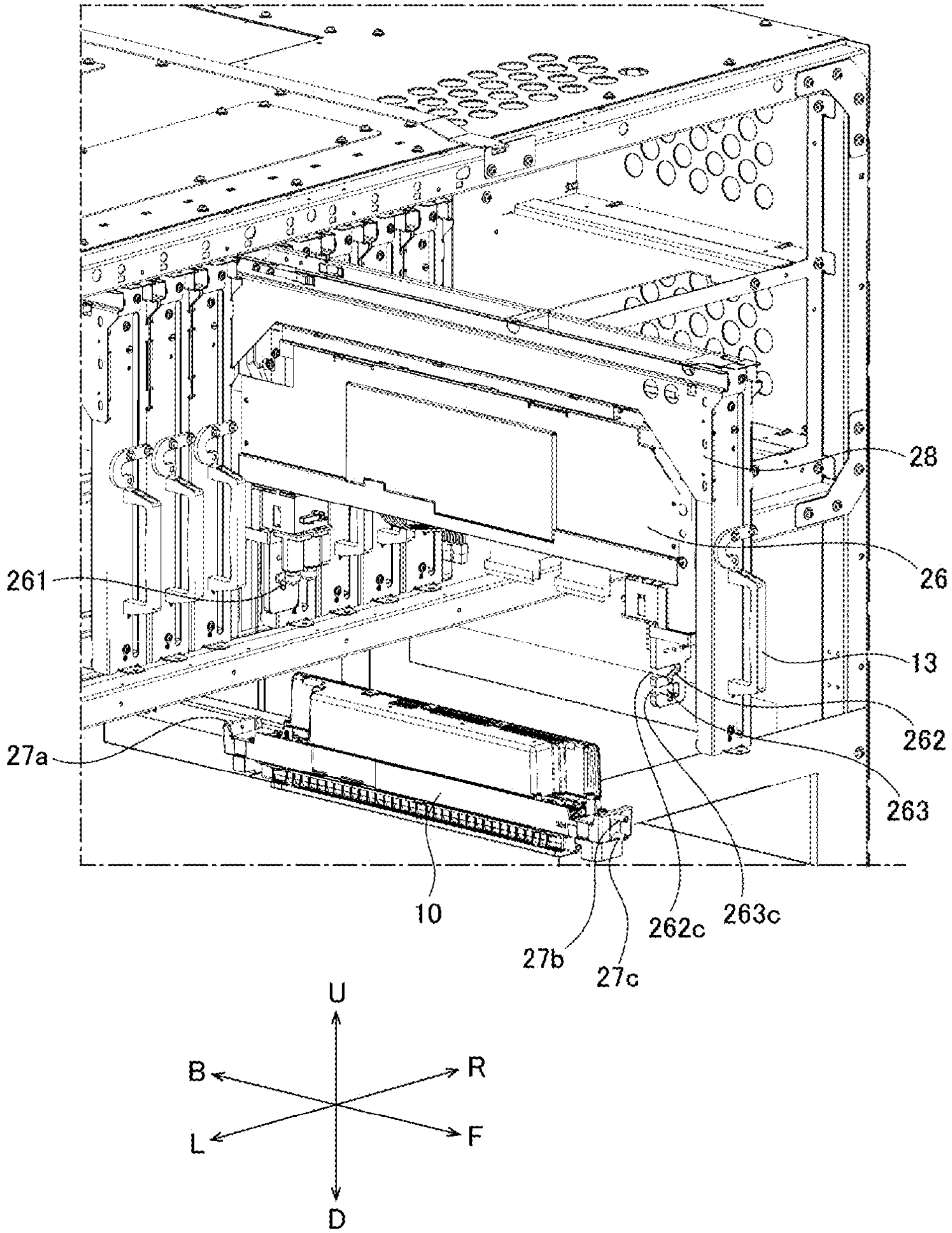
FIG. 11 is a perspective view illustrating a state before the recording head is attached to a head holder.

Next, configurations of the recording portion 2300 and the print belt unit 2200 in the present embodiment will be described with reference to FIGS. 3 to 11. FIG. 3 is a schematic view of the print module 2000 with a front door (exterior cover) covering the recording portion 2300 opened when viewed from the front. FIG. 4 is a perspective view of the print belt unit 2200. FIG. 5 is a perspective view of the recording head 10 when viewed from an ink ejection surface direction. FIG. 6 is a perspective view illustrating a state in which the recording head 10 is at the retracted position, and FIG. 7 is a perspective view illustrating a state in which the recording head 10 is at the printing position. FIGS. 8A to 10B are views for describing movement of the recording head 10 to the printing position. FIG. 11 is a perspective view illustrating a state before the recording head is attached to a head holder.

An upward direction U, a downward direction D, a right direction R, a left direction L, a rear direction B, and a front direction F used in the following description are defined as illustrated in FIG. 3. A side of a body frame 200 (print module 2000) illustrated in FIG. 3 on which a front door 100 serving as the exterior cover is disposed is defined as a front side (front surface side), and a side opposite thereto is defined as a rear side (back side or back surface side). Based on the recording portion 2300, a side on which the scanner unit 11 (see FIG. 2) is disposed is defined as a left side. Based on the recording portion 2300, a side on which the maintenance portion 2600 is disposed is defined as a right side. Furthermore, an upward direction in the vertical direction that is perpendicular to a front-rear direction and the left-right direction defined here is defined as an upward direction, and a downward direction in the vertical direction that is perpendicular to the front-rear direction and the left-right direction defined here is defined as a downward direction. The front direction F, the rear direction B, the right direction R, the left direction L, the upward direction U, and the downward direction D that are defined are illustrated in FIG. 3. The left-right direction is a direction orthogonal to the vertical direction (upward-downward direction), and is the same as the conveying direction in which the paper sheet serving as the sheet is conveyed. The front-rear direction is a direction orthogonal to the vertical direction and the left-right direction (first direction).

As illustrated in FIG. 4, the print belt unit 2200 includes a print belt 2201, a belt roller 2202, a suction unit 2203, a cleaning unit 2210, and the like. The print belt 2201 serves as a contact surface that comes into contact with the paper sheet when the paper sheet is conveyed, and a plurality of suction holes 2201*a* is provided in the left-right direction and the front-rear direction. The suction holes 2201*a* are through-holes penetrating through the print belt 2201 in a thickness direction, and are provided so as to be distributed inside and outside a region through which the paper sheet passes when the paper sheet is conveyed. The belt roller 2202 keeps a tension of the print belt 2201 constant. The suction unit 2203 sucks the paper sheet through the suction holes 2201*a*. The cleaning unit 2210 abuts on the print belt 2201 and wipes off mist and paper dust adhering to a surface of the print belt 2201. In the present embodiment, the number of suction units 2203 arranged in the print belt unit 2200 is four, but the number of suction units 2203 is not limited to four.

The print belt unit 2200 is disposed immediately below the recording head 10. That is, the print belt unit 2200 is disposed at a position facing the recording portion 2300 in the vertical direction. The print belt unit 2200 has a height adjustment function of adjusting a height of the paper sheet conveyance surface (sheet conveyance surface) such that a surface of the paper sheet has a predetermined clearance with the recording head 10 according to a thickness of the paper sheet. As described above, the print belt unit 2200 has a suction conveyance function of conveying the paper sheet while keeping the paper sheet flat along a surface of a conveyance belt.

Positioning members 811 for positioning the recording head 10 at the printing position (recording position) are provided on a housing 81 of the print belt unit 2200. Specifically, for one recording head 10, one positioning member 811*a* is provided on the front side (an apparatus front surface side) in the front-rear direction (a paper sheet width direction) and two positioning members 811_b_ and 811_c_ are provided on the back side (an apparatus back surface side) while having the print belt 2201 interposed between the positioning member 811_a_ and the positioning members 811_b_ and 811_c_.

As illustrated in FIG. 5, in the recording head 10, a nozzle plate 223 including a plurality of nozzles for ejecting the ink is aligned in a longitudinal direction of the recording head 10 (the paper sheet width direction or front-rear direction), and abutting portions 221 are provided at both ends of the recording head 10. Specifically, a first abutting portion 221_a_ formed of a recessed portion having a conical slope and positioned on the front side in the longitudinal direction of the recording head 10, a second abutting portion 221_b_ formed of a groove portion having two V-shaped flat surfaces on the back side in the longitudinal direction, and a third abutting portion 221_c_ formed of a planar portion are provided. Here, a guide shape 221_d_ is provided in the vicinity of the third abutting portion 221_c_ formed of the planar portion, and serves to solve a problem that when the third abutting portion 221_c_ and a recording head positioning member 811_c_ abut on each other, slippage of the recording head (ink ejection head) 10 occurs, a ball does not enter a positioning portion, and positioning cannot be performed.

FIG. 6 is a schematic perspective view illustrating a state in which the recording head 10 is at the retracted position to which the recording head 10 is retracted upward from the print belt unit 2200. FIG. 7 is a schematic perspective view illustrating a state in which the recording head 10 is at the printing position (recording position) where the image is printed on the paper sheet. The recording head 10 is detachably attachable to the head holder 26. The recording head 10 is automatically lifted and lowered integrally with the head holder 26 by a driving mechanism (not illustrated) between the printing position close to the paper sheet conveyance surface 24 and the retracted position when printing is not performed, along a lifting and lowering rail 29 provided in a recording head lifting and lowering frame 28.

Figure 8A:
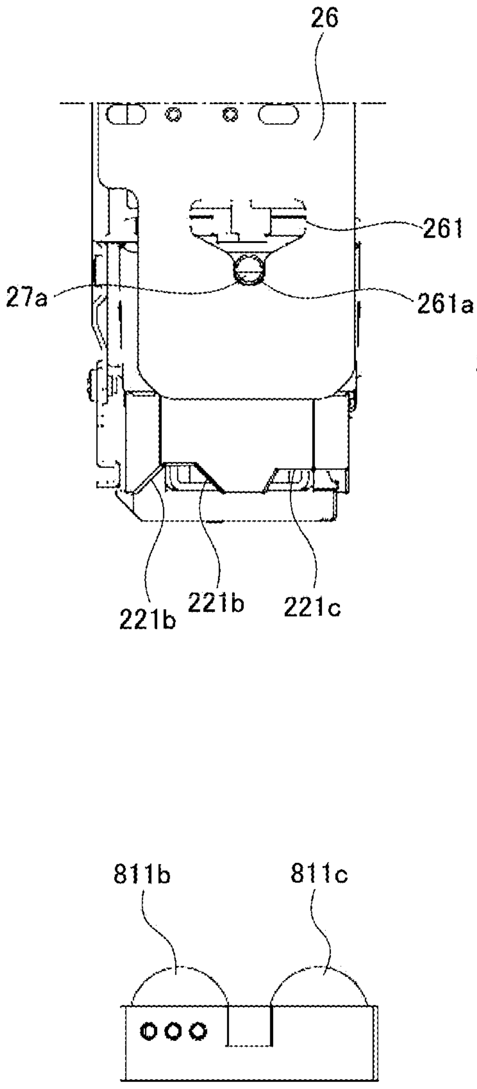
FIGS. 8A and 8B are views for describing movement of the recording head to the printing position.
Figure 8B:
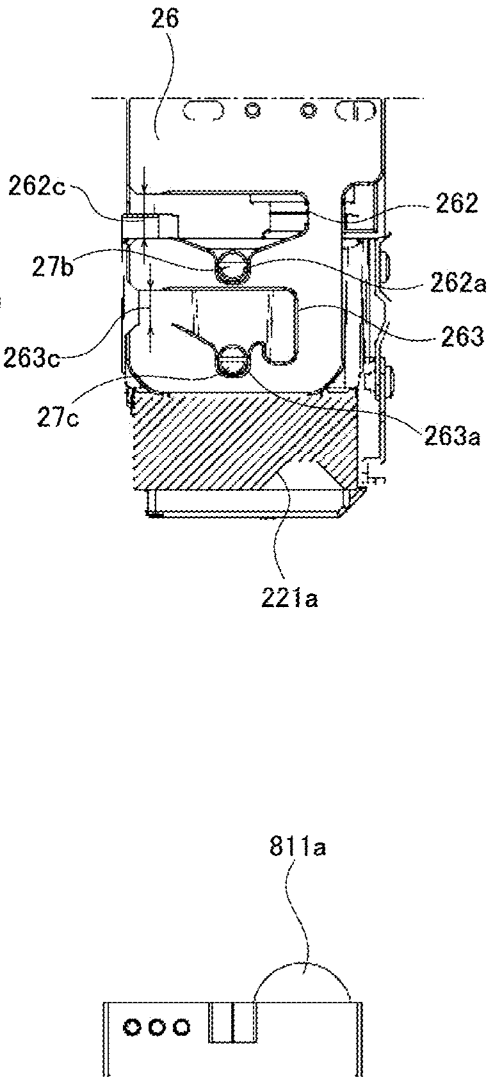

A state in which the recording head 10 moves from the retracted position to the printing position and is engaged with the positioning members 811 will be described with reference to FIGS. 8A to 10B. In FIGS. 8A to 10B, FIGS. 8A, 9A, and 10A are views of the recording head 10 when viewed from the rear in the front-rear direction. FIGS. 8B, 9B, and 10B are views of the recording head 10 when viewed from the front in the front-rear direction. The recording head 10 (FIGS. 8A and 8B) at the retracted position is lowered integrally with the head holder 26 and lands on the positioning members 811_a_ to 811_c_ of the print belt unit 2200 (FIGS. 9A and 9B). Thereafter, as the head holder 26 is further lowered, a weight of the recording head 10 is applied to the positioning members 811_a_ to 811_c_, as a result of which spherical shapes of the positioning members 811_a_ to 811_c_ and conical recess shapes of positioning portions 211_a_ to 211_c_ of the recording head 10 are strongly engaged (FIGS. 10A and 10B). Therefore, the recording head 10 and the print belt unit 2200 can be positioned with high accuracy. The recording head 10 may abut on the positioning members 811_a_ to 811_c_ only by the weight of the recording head 10, or by applying an abutment pressure by another pressurizing unit (not illustrated).

Next, attachment work when setting the recording head 10 in the print module 2000 will be described with reference to FIG. 11. FIG. 11 is a perspective view illustrating a state before the recording head 10 is attached to the print module 2000.

As illustrated in FIG. 11, when setting the recording head 10 in the print module 2000, first, the recording head lifting and lowering frame 28 is pulled out from the print module 2000 to the front side in the front-rear direction. The recording portion 2300 includes a pull 13 provided at a front end of the recording head lifting and lowering frame 28 in the front-rear direction. The operator pulls out the recording head lifting and lowering frame 28 to the front side in the front-rear direction from the print module 2000 by using the pull 13. Then, the operator moves to a left side of the pulled out recording head lifting and lowering frame 28, faces a left surface of the head holder 26, and attaches the recording head 10. The recording head 10 is held by the head holder 26 having the automatic lifting and lowering function as described above, and is connected to the head holder 26 by a pin or the like described below.

When attaching the recording head 10 to the head holder 26, first, a first pin 27_a_ provided on a back side of the recording head 10 is inserted into a first hole 261 of the head holder 26. Thereafter, a second pin 27_b_ provided on a front side of the recording head 10 is guided into a second hole 262 through a second notch 262_c_ of the head holder 26, and a third pin 27_c_ is guided into a third hole 263 through a third notch 263_c_. Further, the first pin 27_a_, the second pin 27_b_, and the third pin 27_c_ are supported by a first groove portion 261_a_ of the first hole 261, a second groove portion 262_a_ of the second hole 262, and a third groove portion 263_a_ of the third hole 263, respectively. Therefore, the recording head 10 can be attached to the head holder 26 in a state in which a posture of the recording head 10 with respect to the head holder 26 is determined. At this time, as illustrated in FIG. 11, the first pin 27_a_ and the first hole 261 are disposed on the back side in the paper sheet width direction, and the second pin 27_b_, the third pin 27_c_, the second hole 262, and the third hole 263 are disposed on the front side in the paper sheet width direction. Therefore, the first pin 27_a_ only needs to be inserted into the first hole 261 on the back side far from a hand of the operator, and the second pin 27_b_ and the third pin 27_c_ are respectively guided into the second hole 262 and the third hole 263 on the front side close to the hand. Thus, the recording head 10 can be easily set on the head holder 26.

As described above, the print belt unit 2200 includes the print belt 2201 serving as the conveyance belt that sucks and conveys the paper sheet. The print belt 2201 has a color (dark color) with a high contrast ratio to the paper sheet (sheet).

<Configuration of Reading Portion>

Next, a configuration of the scanner unit 11 serving as the reading portion will be described with reference to FIGS. 12A, 12B, 13A, and 13B. FIGS. 12A to 13B are perspective views illustrating a lifting and lowering operation and a rotation operation as movement operations of the scanner unit 11.

Figure 12A:
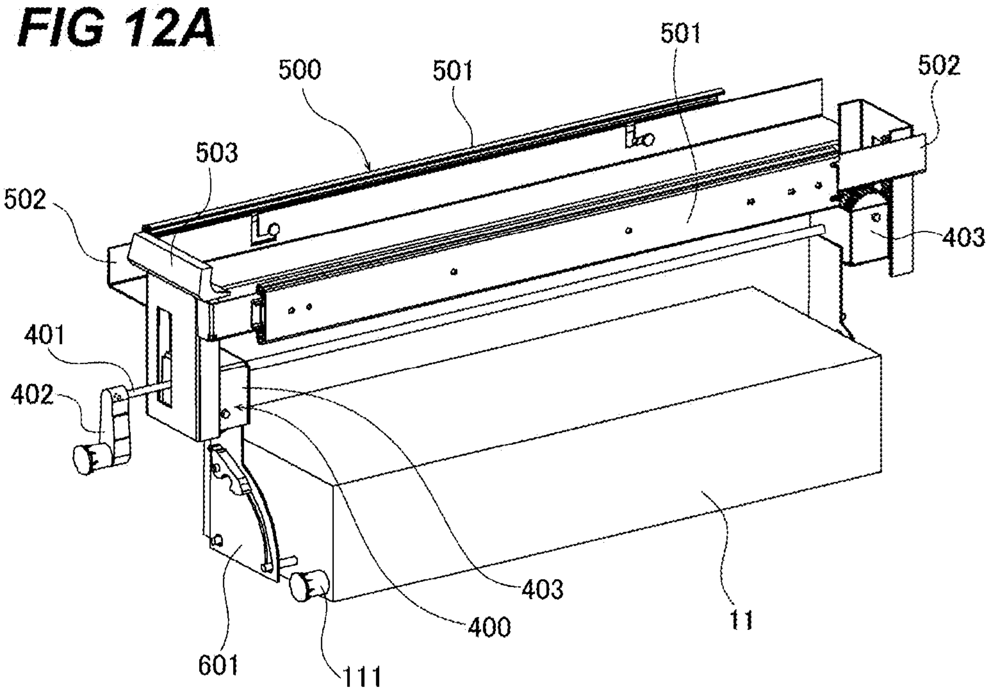
FIGS. 12A and 12B are perspective views illustrating a movement operation of a scanner unit.
Figure 12B:
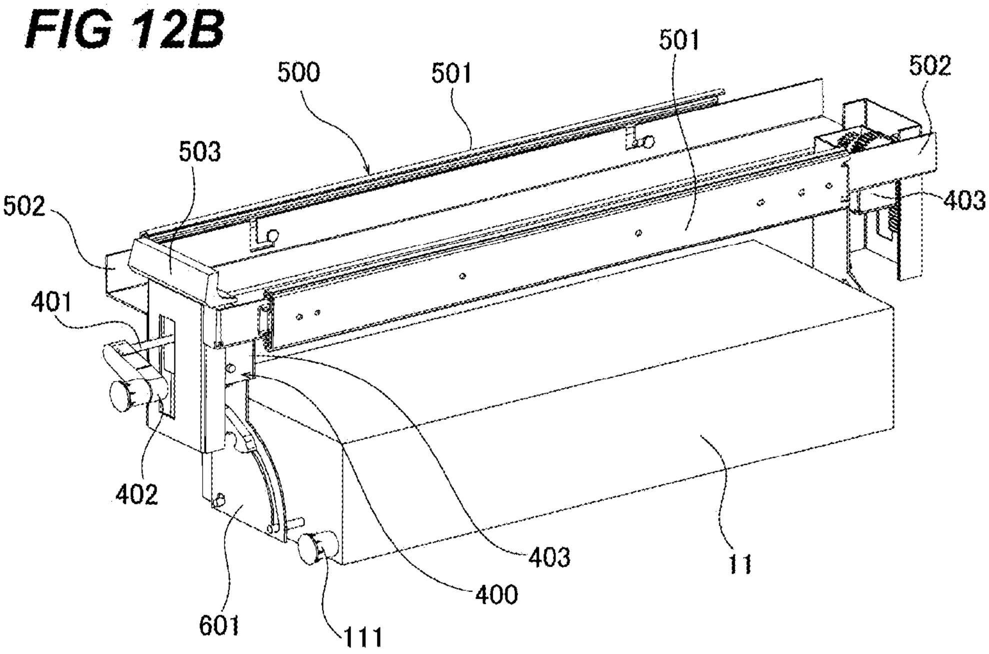

The scanner unit 11 is provided to be movable between a reading position where the image of the paper sheet can be read and a separated position further separated from the print belt 2201 than the reading position. FIG. 12A illustrates a case where the scanner unit 11 is at the reading position, and FIG. 12B illustrates a case where the scanner unit 11 is at the separated position. As illustrated in FIGS. 12A and 12B, the scanner unit 11 is moved between the reading position and the separated position in the vertical direction by a lifting and lowering unit 400 in a state in which a reading surface 112 faces downward in the vertical direction and faces the print belt 2201. In the present embodiment, when the scanner unit 11 is at the reading position and the separated position, the reading surface 112 is at a facing position at which the reading surface 112 faces the print belt 2201.

The lifting and lowering unit 400 will be described with reference to FIGS. 12A and 12B. As illustrated in FIGS. 12A and 12B, the lifting and lowering unit 400 includes a rotation shaft 401, a handle 402, and a pair of lifting and lowering portions 403. The rotation shaft 401 extends in the front-rear direction (paper sheet width direction) orthogonal to the conveying direction in which the paper sheet is conveyed and the vertical direction. The handle 402 is fixed to one end portion of the rotation shaft 401 in a width direction to enable a user (operator) to grip and rotate the rotation shaft 401.

The pair of lifting and lowering portions 403 is disposed at both end portions of the rotation shaft 401 in the width direction so as to face each other, and rotatably supports the rotation shaft 401. The lifting and lowering portions 403 lift and lower the scanner unit 11 in the vertical direction according to the rotation of the rotation shaft 401. However, a holding plate 601 is provided below each of the lifting and lowering portions 403 in the vertical direction, and the holding plate 601 holds the scanner unit 11 such that the scanner unit 11 is rotatable. In the present embodiment, when the user rotates the handle 402, the holding plate 601 moves in the vertical direction together with the lifting and lowering portion 403 and the rotation shaft 401, and the scanner unit 11 held by the holding plate 601 is lifted and lowered accordingly.

With the lifting and lowering unit 400 described above, the user can lift and lower the scanner unit 11 in the vertical direction by operating the handle 402. In the present embodiment, when the user wants to clean the reading surface 112 of the scanner unit 11, the user first needs to move the scanner unit 11 from the reading position (see FIG. 12A) to the separated position (see FIG. 12B). In this case, the user grips the handle 402 and operates the rotation shaft 401 to rotate in a clockwise direction. Then, the lifting and lowering portions 403 move upward in the vertical direction, and thus, the scanner unit 11 held by the holding plate 601 moves to the separated position. The separated position is a position farther from the print belt 2201 than the reading position.

Figures 13A, 13B:
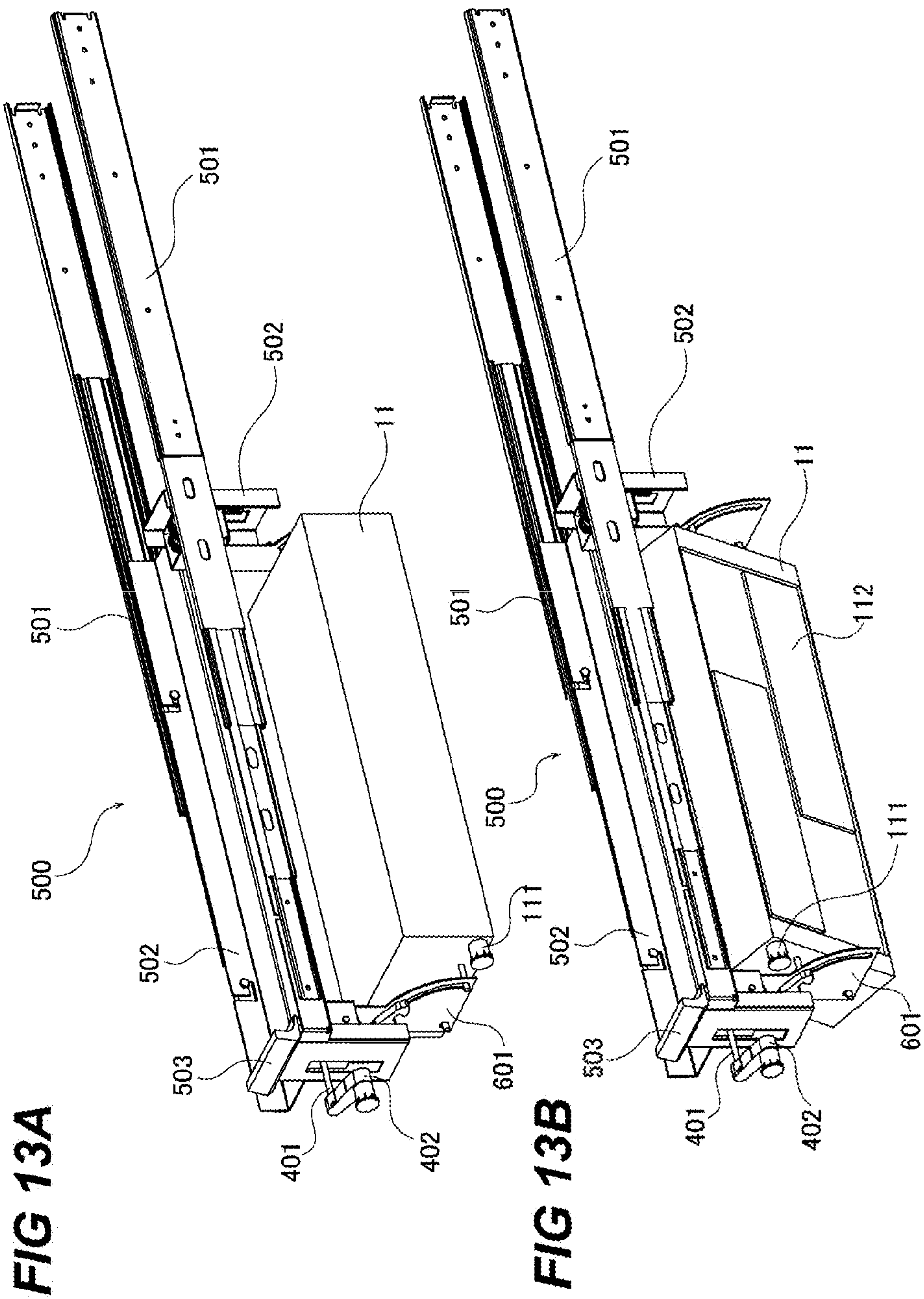
FIGS. 13A and 13B are perspective views illustrating a movement operation of the scanner unit.

Further, the scanner unit 11 is provided so as to be movable between the facing position where the reading surface 112 faces the print belt 2201 and a non-facing position (hereinafter, referred to as a pulled-out position) where the reading surface 112 does not face the print belt 2201 in the front-rear direction, in a state in which the scanner unit 11 is at the separated position described above (see FIG. 12B). FIG. 13A illustrates a case where the scanner unit 11 is at the pulled-out position. As illustrated in FIG. 13A, the scanner unit 11 is slid and moved between the separated position (facing position) and the pulled-out position in the width direction by a pulling unit 500 in a state in which the reading surface 112 faces downward in the vertical direction.

The pulling unit 500 will be described with reference to FIGS. 12B and 13A.

Note that FIG. 12B illustrates a state in which the scanner unit 11 is at the separated position, that is, a state before the scanner unit 11 is pulled out to the pulled-out position. As illustrated in FIG. 12B, the pulling unit 500 includes a pair of slide rails 501 extending in the width direction at intervals in the conveying direction, and a moving frame 502 holding the lifting and lowering unit 400 and provided slidably along the slide rails 501 so as to be movable between the separated position and the pulled-out position. The slide rail 501 is fixed to a housing of the print module 2000. A frame grip portion 503 that can be gripped by the user to slide the moving frame 502 is provided on one end side of the moving frame 502 in the width direction.

When the user wants to clean the reading surface 112 of the scanner unit 11, the user needs to move the scanner unit 11 from the reading position (see FIG. 12A) to the separated position (see FIG. 12B) and then from the separated position (facing position) to the pulled-out position (see FIG. 13A).

In this case, the handle 402 is manually rotated to lift the scanner unit 11 from the reading position to the separated position (the position illustrated in FIG. 12B). Thereafter, the user grips the frame grip portion 503 and pulls the moving frame 502 toward the front side. Then, the moving frame 502 slides to the pulled-out position along the slide rail 501. As a result, the lifting and lowering unit 400 also moves to the pulled-out position, and thus, the scanner unit 11 held by the holding plate 601 moves to the pulled-out position. In the present embodiment, when the scanner unit 11 is at the pulled-out position, the scanner unit 11 is in a state of being pulled out from the inside of the housing of the print module 2000 to the outside of the housing toward the front side of the housing, and the reading surface 112 is exposed to the outside of the housing of the print module 2000.

Then, the user holds a rotation operation lever 111 and rotates the scanner unit 11 by approximately 90° to facilitate wiping work (see FIG. 13B), and cleans the reading surface 112, so that the reading surface 112 can be visually recognized. In the present embodiment, the lifting and lowering function is executed by operating the handle 402, but the lifting and lowering of the scanner unit 11 may be performed manually or automatically by electric power.

Note that the scanner unit 11 disposed downstream of the recording portion 2300 has a positioning configuration similar to that of the recording head 10 described above, and there is a difference in whether the lifting and lowering operation is performed automatically or manually. Since the scanner unit 11 is lifted and lowered only when cleaning the reading surface 112, the frequency of lifting and lowering the scanner unit 11 is low, and thus, a method in which the lifting and lowering operation is performed manually is adopted.

<Configuration of Maintenance Portion>

A configuration of the maintenance portion 2600 will be described with reference to FIG. 2.

As described above, the maintenance portion 2600 includes the cap tray 18 in which the capping mechanism (not illustrated) is disposed and the cleaning tray 19 in which the cleaning mechanism (not illustrated) is disposed. The cap tray 18 and the cleaning tray 19 are configured to be individually movable in the left-right direction of the print module 2000 along a rail (not illustrated) provided in the print module 2000. The rail is a guide mechanism that guides the movement in the left-right direction while supporting end portions of the cap tray 18 and the cleaning tray 19 in the paper sheet width direction (front-rear direction).

The cap tray 18 and the cleaning tray 19 are positioned upstream (on the right side) of the recording portion 2300 in the paper sheet conveying direction in a recording state in which recording is performed on the paper sheet by the recording head 10. In the recording state, the cap tray 18 is positioned directly above the cleaning tray 19. The positions of the cap tray 18 and the cleaning tray 19 in the recording state are also referred to as standby positions.

When the ink ejection surface of the recording head 10 is in a capped state in which the ink ejection surface is capped by the capping mechanism, the cap tray 18 is positioned directly below the recording head 10 of the recording portion 2300, and the cleaning tray 19 is positioned upstream of the recording portion 2300 in the paper sheet conveying direction. That is, in the capped state, the cap tray 18 is at a capping position by being moved from the standby position to the capping position positioned downstream in the paper sheet conveying direction along the rail, and the cleaning tray 19 is positioned at the standby position.

In a cleaning state in which the ink ejection surface of the recording head 10 is cleaned by the cleaning mechanism, the cleaning tray 19 is positioned immediately below the recording head 10 of the recording portion 2300, and the cap tray 18 is positioned upstream of the recording portion 2300 in the paper sheet conveying direction. That is, in the cleaning state, the cleaning tray 19 is at a cleaning position by being moved from the standby position to the cleaning position positioned downstream in the paper sheet conveying direction along the rail, and the cap tray 18 is at the standby position.

Each capping mechanism in the cap tray 18 includes a plurality of spherical positioning members (not illustrated) for positioning the recording head 10 with respect to the capping mechanism. The positioning members are disposed at both ends of each capping mechanism in the paper sheet width direction (front-rear direction). That is, the positioning members are provided similarly to the positioning members 811*a* to 811*c* in the print belt unit 2200. The recording head 10 and the capping mechanism can be positioned by engaging the positioning portions 211*a* to 211*c* of the recording head 10 with the positioning members of the capping mechanism.

Similarly to the positioning members of the capping mechanism, the cleaning tray 19 includes a plurality of spherical positioning members (not illustrated) for positioning the recording head 10 with respect to the cleaning tray 19. That is, the positioning members are provided similarly to the positioning members 811*a* to 811*c* in the print belt unit 2200. The recording head 10 and the cleaning tray 19 can be positioned by engaging the positioning portions 211*a* to 211*c* of the recording head 10 with the positioning members of the cleaning tray 19.

The cleaning tray 19 includes a movement mechanism (not illustrated) that moves the cleaning mechanism (not illustrated) for receiving the ejection performance of the recording head 10 in a wiping direction (front-rear direction) orthogonal to the paper sheet conveying direction. The cleaning mechanism recovers the ejection performance of the recording head 10 by removing the ink and dust attached to the ink ejection surface of the recording head 10 while moving in the wiping direction by the movement mechanism.

<Configuration of Body Frame>

Figure 14:
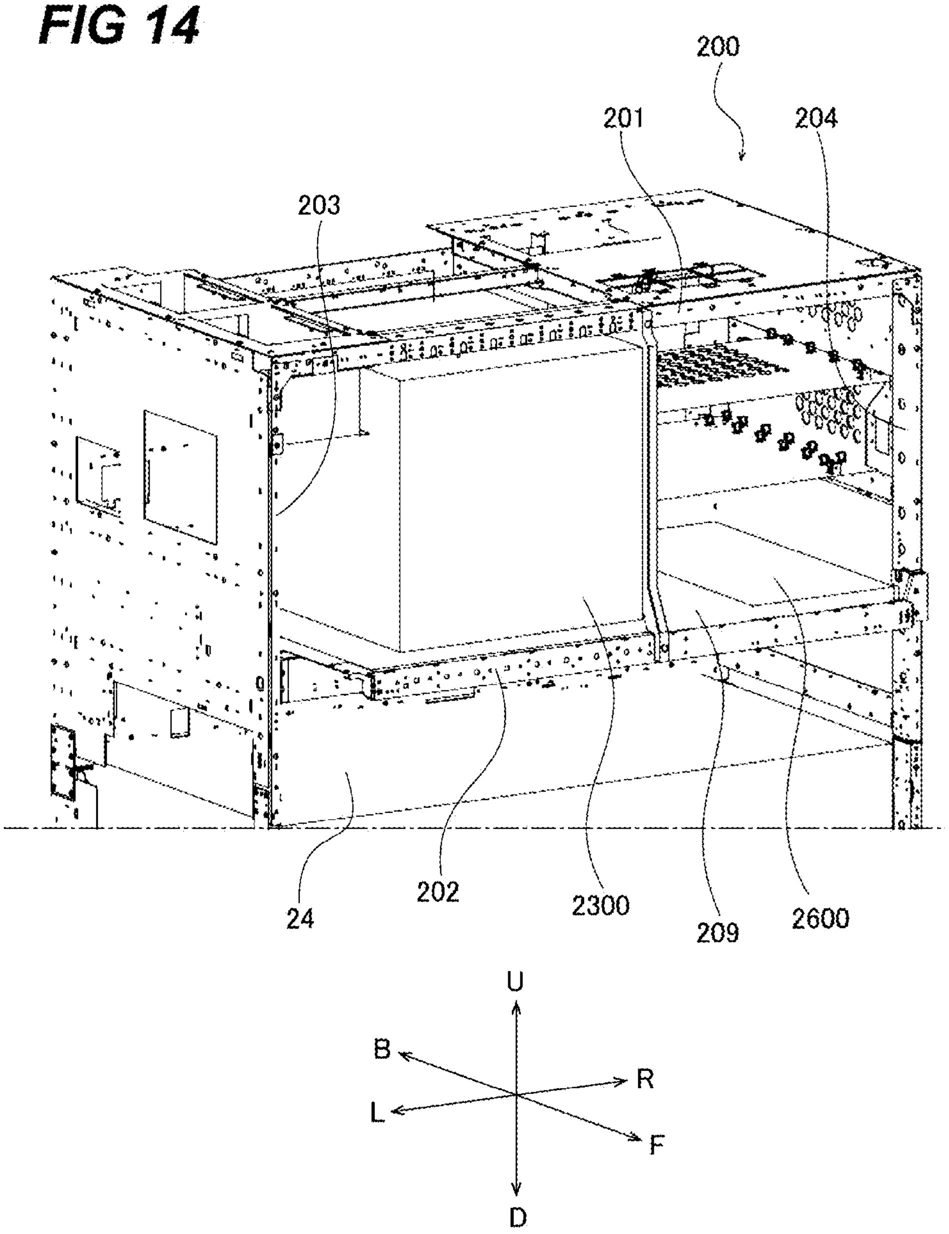
FIG. 14 is a schematic perspective view illustrating a state in which the recording portion and a maintenance portion are mounted on a body frame of the print module.
Figure 15:
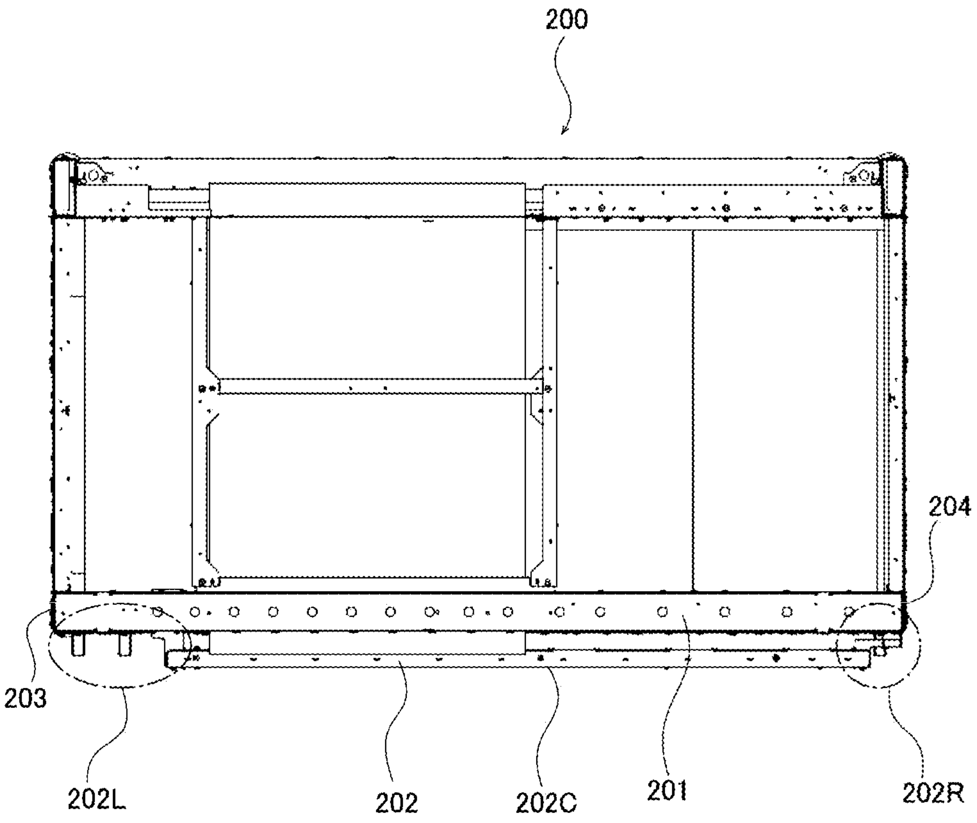
FIG. 15 is a schematic view of the body frame of the print module when viewed from directly above.
Figure 16:
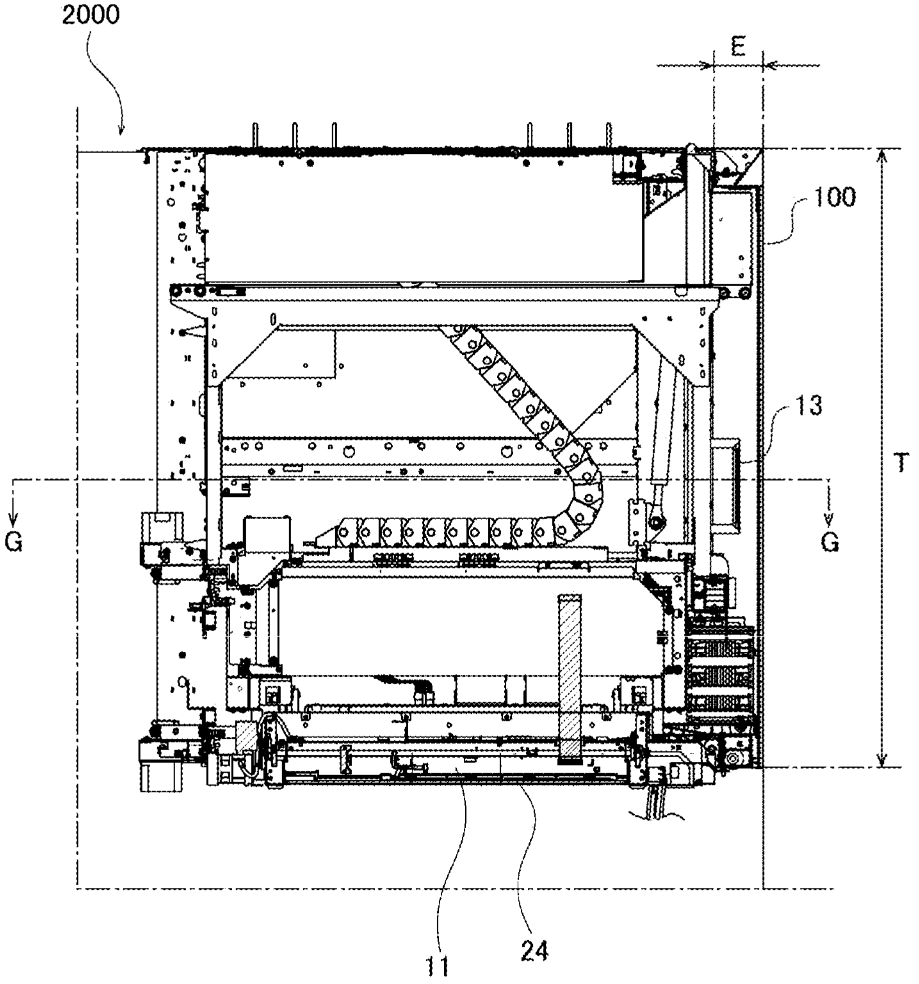
FIG. 16 is a left cross-sectional view of the print module.
Figure 17:
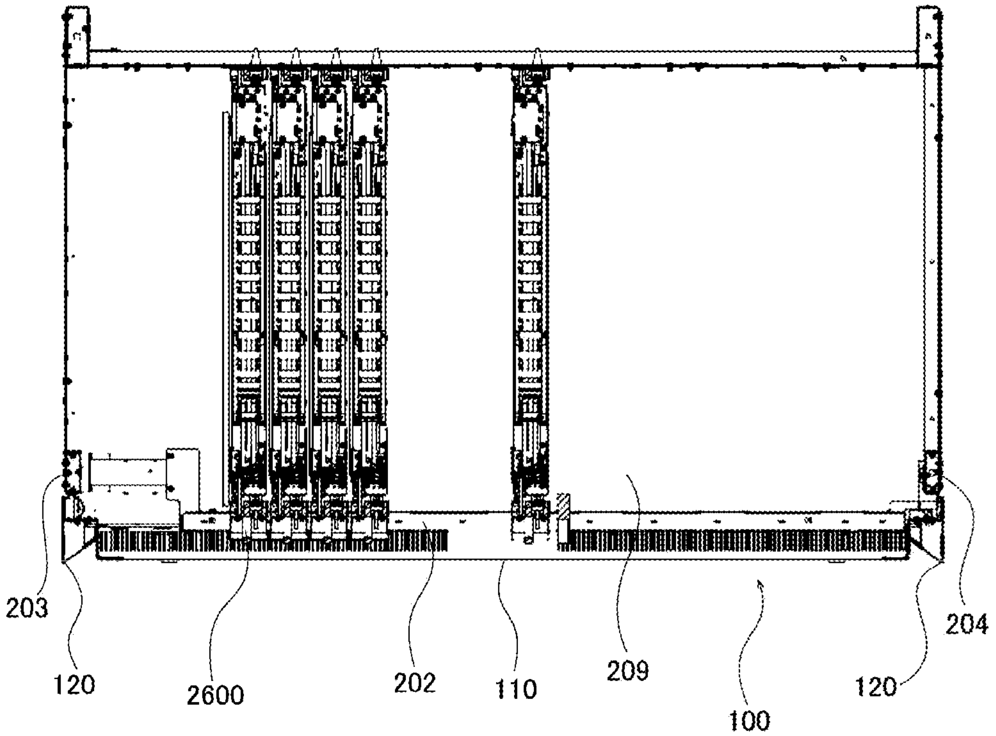
FIG. 17 is a cross-sectional view of the print module taken along line G-G of FIG. 16.

Next, the body frame 200 of the print module 2000 will be described with reference to FIGS. 14, 15, 16, and 17. FIG. 14 is a perspective view illustrating a state in which the recording portion 2300 and the maintenance portion 2600 are mounted on the body frame 200 of the print module 2000. FIG. 15 is a schematic view of the body frame of the print module when viewed from directly above. FIG. 16 is a left cross-sectional view of the print module 2000. FIG. 17 is a cross-sectional view of the print module 2000 taken along line G-G of FIG. 16.

The print module 2000 includes the body frame 200 that supports the recording portion 2300 and the print belt unit 2200. The body frame 200 includes an upper horizontal column 201, a middle horizontal column 202, a left support column 203, a right support column 204, and the like.

The body frame 200 includes a left support column 203 and the right support column 204 provided on both sides in the left-right direction. Each of the left support column 203 and the right support column 204 extends in the vertical direction. In other words, the left support column 203 and the right support column 204 are provided to face each other in the left-right direction of the body frame 200. The left support column 203 is disposed on a left front side of the body frame 200, and the right support column 204 is disposed on a right front side of the body frame 200.

The recording portion 2300, the scanner unit 11, and the maintenance portion 2600 are supported by the body frame 200. The recording portion 2300, the scanner unit 11, and the maintenance portion 2600 are disposed between the left support column 203 and the right support column 204 of the body frame 200. The scanner unit 11 is disposed on a left side of the recording portion 2300 between the left support column 203 and the right support column 204 of the body frame 200. That is, the scanner unit 11 is disposed between the left support column 203 and the recording portion 2300. The maintenance portion 2600 is disposed on a right side of the recording portion 2300 between the left support column 203 and the right support column 204 of the body frame 200. That is, the maintenance portion 2600 is disposed between the right support column 204 and the recording portion 2300.

In the body frame 200, the upper horizontal column 201 is provided so as to extend in the left-right direction between the left support column 203 and the right support column 204 of the body frame 200. The upper horizontal column 201 is connected to an upper end of the left support column 203 and an upper end of the right support column 204. The middle horizontal column 202 is provided so as to extend in the left-right direction between the left support column 203 and the right support column 204 of the body frame 200, and is provided below the upper horizontal column 201. The middle horizontal column 202 is connected to each of the left support column 203 and the right support column 204. As illustrated in FIG. 14, each of the upper horizontal column 201 and the middle horizontal column 202 is disposed so as to extend in the left-right direction.

The recording portion 2300, the scanner unit 11, and the maintenance portion 2600 are disposed lower than the upper horizontal column 201 of the body frame 200. As for a relative relationship with the middle horizontal column 202, the recording portion 2300 is disposed higher than the middle horizontal column 202. In other words, the recording portion 2300 is disposed between the upper horizontal column 201 and the middle horizontal column 202 of the body frame 200. On the other hand, the scanner unit 11 is disposed lower than the middle horizontal column 202. The maintenance portion 2600 is disposed vertically across the middle horizontal column 202.

<Size of Body Frame>

Here, a size of the body frame 200 in the front-rear direction will be described.

As described above, the recording portion 2300 includes a plurality of sets of the recording head 10, the head holder 26, and the like, and is attached to the upper horizontal column 201 and the middle horizontal column 202 of the body frame 200. The size (front-back dimension) of the recording portion 2300 in the front-rear direction is mainly determined from the following requirements (1) and (2).

(1) A width of the recording head 10 in a longitudinal direction (front-rear direction) of the nozzle plate 223 is a width of a paper sheet of the maximum size+a (an ink application margin region for absorbing a paper sheet position deviation). (2) The abutting portions 221 that are engaged with the positioning members 811 arranged for the recording head 10 to land on the print belt unit 2200 are arranged in a front-back region of the nozzle plate 223 of the recording head 10. The recording head 10 is required to have a front-back (longitudinal) dimension based on these requirements, and the front-back dimension of the recording portion 2300 is determined by additionally considering the recording head lifting and lowering frame 28 having a function for lifting and lowering the head holder 26 and the recording head 10.

Further, a front-back (longitudinal) dimension of the maintenance portion 2600 is determined by the following requirements (1) to (4).

(1) Front-back dimensions of a landing component of the recording head 10 similar to that of the print belt unit 2200 for landing the recording head 10 on the capping mechanism or the cleaning mechanism. (2) A front-back dimension of the cap tray 18 holding the capping mechanism and the head landing component. (3) A front-back dimension of the cleaning tray 19 holding the cleaning mechanism and the head landing component. (4) Front-back dimensions of a rail component that moves each of the cap tray 18 and the cleaning tray 19 in the left-right direction below the recording portion 2300. The front-back dimension of the maintenance portion 2600 is determined based on these requirements.

A position of the middle horizontal column 202 in the front-rear direction in the body frame 200 is determined from the two configuration requirements for the front-back dimension of the recording portion 2300 and the front-back dimension of the maintenance portion 2600. In order to use a space on an inner side of the front door 100 serving as the exterior cover described below, the middle horizontal column 202 offsets a connection portion with the left and right support columns to the back side.

Specifically, as illustrated in FIG. 15, the middle horizontal column 202 has a recess 202L, a protrusion 202C, and a recess 202R. The protrusion 202C is positioned between the recess 202L and the recess 202R in the left-right direction. That is, the middle horizontal column 202 extends in the left-right direction. The recess 202L of the middle horizontal column 202 is connected to the left support column 203. The recess 202R of the middle horizontal column 202 is connected to the right support column 204. The protrusion 202C is offset to the front side with respect to the recess 202L and the recess 202R in the front-rear direction. That is, the middle horizontal column 202 has an offset portion (protrusion 202C) protruding forward in the front-rear direction. In other words, portions (that is, the recess 202L and the recess 202R) positioned on both sides in the left-right direction and facing a front door frame 120 of the front door 100 described below are offset to the back side. The protrusion 202C between the recess 202L and the recess 202R on both sides of the middle horizontal column 202 is accommodated in an internal space (a region E illustrated in FIG. 17) surrounded by the front door frame 120 of the front door 100. In other words, a position of at least a part of the protrusion 202C in the front-rear direction is the same as a position of the front door frame 120 of the front door 100 in a closed state in the front-rear direction. That is, when viewed along a line of sight in the left-right direction, the front door frame 120 of the front door 100 and the protrusion 202C at least partially overlap each other.

The recording portion 2300 is attached to and held by the middle horizontal column 202 and the upper horizontal column 201 on a front surface of the body frame 200. With this configuration, the recording portion 2300 is supported so as to be movable in the front-rear direction as illustrated in FIG. 11, and can be pulled out to the front side of the body frame 200.

The middle horizontal column 202 is disposed between the left support column 203 and the right support column 204 on the front surface of the body frame 200, and supports internal units such as the recording portion 2300 and the maintenance portion 2600 moved in the paper sheet conveying direction. In the body frame 200, an internal space 209 in which the recording portion 2300 and the maintenance portion 2600 are disposed is provided on a back surface side of the middle horizontal column 202 (an inner side of the body frame). The recording portion 2300 passes through the internal space 209 on the back surface side of the middle horizontal column 202 in the lifting and lowering operation in the vertical direction. In addition, the maintenance portion 2600 passes through the internal space 209 on the back surface side of the middle horizontal column 202 in the movement operation in the left-right direction.

Usually, it is desirable that the middle horizontal column 202 having a function of supporting the units linearly connects the inside of a region sandwiched between the left and right support columns in a horizontal cross section from the viewpoint of frame rigidity.

Here, in the middle horizontal column 202, a part of or the entire region where the front door frame 120 of the front door 100 is not present when viewed from the front protrudes to the front side of a space sandwiched between the left support column 203 and the right support column 204. That is, the protrusion 202C between the recess 202L and the recess 202R on both sides of the middle horizontal column 202 protrudes to the front side of the left support column 203 and the right support column 204. As a result, it is possible to secure the wide internal space 209 whose size corresponds to a thickness of the front door frame 120 of the front door 100 at the maximum on the back side of the middle horizontal column 202, and it is thus possible to reduce the entire size of the body frame 200.

In addition, since the front door 100 described below is opened upward and a transparent cover 110 covers the entire space, it is possible to secure a wide and uniform protrudable region where the front door frame 120 of the front door 100 is not present between the left and right support columns. For example, in a case where the front door 100 is not opened upward but is double hinged doors, a frame is required at a divided portion of the doors, and in this region, forward protrusion of the middle horizontal column 202 is hindered. Therefore, the protrudable region cannot be uniformly secured, and it is thus difficult to ensure the rigidity of the middle horizontal column 202.

As described above, the rigidity of the middle horizontal column 202 is ensured by taking a uniform protruding shape and securing rigidity of an end portion region of the middle horizontal column 202 not included in driving paths of the internal units.

<Configuration of Front Door>

Figure 18A:
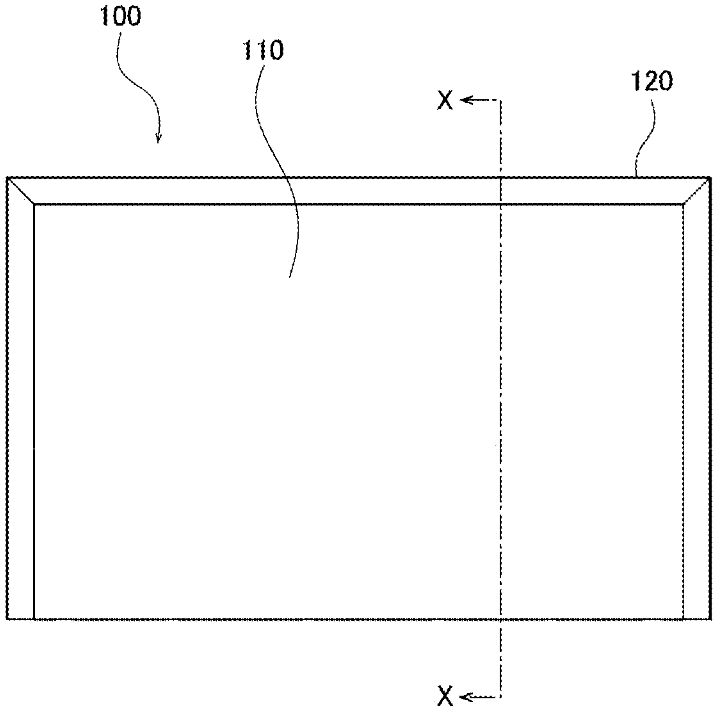
FIGS. 18A and 18B are overall schematic views of the front door of the print module.
Figure 18B:
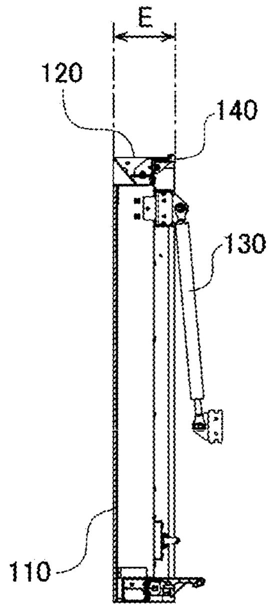
Figure 19:
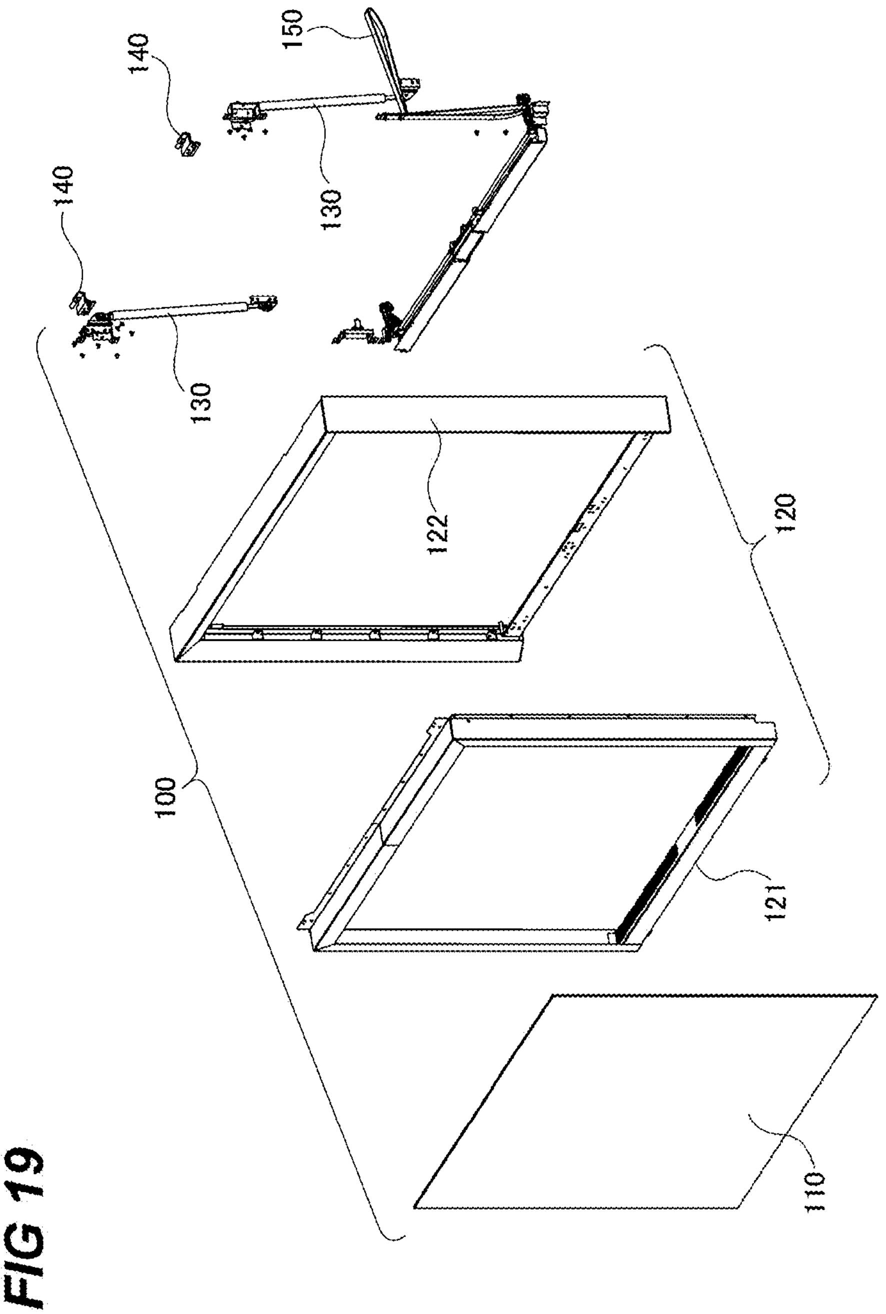
FIG. 19 is an exploded view illustrating a configuration of the front door of the print module.

Next, the front door 100 serving as the exterior cover that forms a front exterior of the print module 2000 on the front side of the recording portion 2300 will be described with reference to FIGS. 16, 17, 18A, 18B, and 19. FIG. 18A is an overall schematic view of the front door of the print module. FIG. 18B is a cross-sectional view of the front door of the print module taken along line X-X of FIG. 18A. FIG. 19 is an exploded view illustrating a configuration of the front door of the print module.

The print module 2000 includes the front door 100 serving as the exterior cover that forms the front exterior of the print module 2000 on the front side of the recording portion 2300 in the front-rear direction orthogonal to the vertical direction and the left-right direction. The front door 100 is disposed on the front side of the recording portion 2300 in the front-rear direction, and is attached to the body frame 200 so as to form the front exterior. The front door 100 includes the transparent cover 110 formed of a transparent material over the entire front surface. The front door 100 is opened and closed by rotating around a rotation axis on an upper end side in the vertical direction.

That is, the front door 100 is attached to the front side of the body frame 200. The front door 100 includes the transparent cover 110 and the front door frame 120 serving as a cover frame having a certain thickness to maintain rigidity of the front door 100. The front door frame 120 is disposed at least a part of the periphery of the transparent cover 110. In the present embodiment, the front door frame 120 surrounds four sides of the transparent cover 110. As a modified example, the front door frame 120 may surround only three sides or only two sides of the transparent cover. Alternatively, the front door frame 120 may be provided only at a part of one side of the transparent cover. The transparent cover 110 is attached to an outer side of the front door frame 120 in a thickness direction. In other words, the transparent cover 110 is disposed on a front end side of the front door frame 120 in the front-rear direction. Here, the front end side refers to a region between the center and a front end of the front door frame 120 in the front-rear direction.

In addition, when the front door 100 is closed, the front door frame 120 is at a position supported by the body frame 200 when viewed from the front, whereby the front door 100 does not enter the internal space 209 on the inner side of the middle horizontal column 202 of the body frame 200.

The front door 100 is formed so as to cover the entire region T (see FIG. 16) above the paper sheet conveyance surface 24 of the print belt 2201 that conveys the paper sheet. Further, the front door 100 includes the transparent cover 110 as illustrated in FIGS. 18A and 18B, so that the recording portion 2300 and other units in the apparatus can be visually recognized from the outside of the apparatus even during the printing operation. The fact that the inside of the apparatus can be visually recognized contributes not only to enabling visual recognition of an operating state of the image forming apparatus, but also to enabling determination of whether or not it is necessary to clean the inside of the apparatus due to adhesion of ink mist.

The paper sheet conveyance surface 24 (see FIG. 14) and the front door 100 above the paper sheet conveyance surface 24 are configured as one unit (front door unit) so that not only the recording portion 2300 but also as wide a region as possible can be visually recognized through the transparent cover 110 from the viewpoint of design. The transparent cover 110 occupies 85% of an area of the front door 100 in a longitudinal direction.

Specifically, the front door frame 120 serving as the cover frame has a left side portion that is a cover frame portion facing the left support column 203 and a right side portion that is a cover frame portion facing the right support column 204. The transparent cover 110 is disposed to span from the left side portion to the right side portion. As described above, a portion of the front door 100 from the left support column 203 to the right support column 204 in the left-right direction of the body frame 200 is formed using the transparent cover 110.

Further, a portion of the front door 100 from the upper horizontal column 201 to the paper sheet conveyance surface 24 of the print belt unit 2200 in the vertical direction of the body frame 200 is formed using the transparent cover 110. As illustrated in FIG. 14, the paper sheet conveyance surface 24 of the print belt unit 2200 is positioned lower than the middle horizontal column 202 of the body frame 200. Therefore, it can also be said that a portion of the front door 100 from the upper horizontal column 201 to the middle horizontal column 202 in the vertical direction of the body frame 200 is formed using the transparent cover 110.

With this configuration, the operating state of the print module 2000 can be visually checked through the transparent cover 110 without opening the front door 100. For example, the lifting and lowering operation and the position of the recording head 10, an operation and a position of the maintenance portion 2600, a position of the scanner unit 11, a state in which the paper sheet is conveyed, and the like can be visually recognized. In addition, a contamination state in the vicinity of the recording portion can be visually recognized and the necessity of cleaning can be determined from the outside of the apparatus even when the apparatus is in operation.

A transparent resin plastic material is selected for the transparent cover 110, and the transparent resin plastic material is made as thin (=light) as possible without impairing texture in view of the weight and crack resistance. Since the transparent cover 110 is made of a thin resin plastic material, the rigidity of the front door 100 is secured by making the thickness (the region E) of the front door frame 120 in the front-rear direction larger than a thickness of the transparent cover 110 in the front-rear direction. That is, the thickness of the front door frame 120 in the front-rear direction is larger than the thickness of the transparent cover in the front-rear direction. Specifically, the thickness of the transparent cover 110 is 5 mm, and the thickness (the region E) of the front door frame 120 is equal to or larger than the thickness of the transparent cover 110 (30 mm or larger).

Here, the front door frame 120 has a thickness of 50 mm in the front-rear direction. The transparent cover 110 has a thickness of 5 mm in the front-rear direction. The transparent cover 110 is disposed on the front end side of the front door frame 120 in the front-rear direction. That is, the transparent cover 110 is disposed on a surface of front door 100 that faces the outside. Therefore, in the front door 100, an internal space (the region E) of 45 mm is formed on an inner side of the transparent cover 110.

Then, as the components of the respective elements in the apparatus are arranged in the space (the region E) inside the front door 100 as illustrated in FIG. 16, a front-back dimension of the apparatus can be reduced. The middle horizontal column 202 and the recording portion 2300 are accommodated inside a portion corresponding to the thickness (the region E) of the front door frame 120 of the front door 100 in a state in which the recording portion 2300 is attached to the middle horizontal column 202 of the body frame 200 as illustrated in FIG. 17.

In other words, in the body frame 200 described above, the left support column 203, the right support column 204, and the upper horizontal column 201 of the body frame 200 facing the front door frame 120 of the front door 100 in the front-rear direction are offset to the back side of a front end portion of the recording portion 2300 supported by the body frame 200. As a result, the body frame 200 is reduced in size, and the front end portion of the recording portion 2300 in the front-rear direction enters the internal space corresponding to the thickness (45 mm) of the front door frame 120 of the front door 100 in the front-rear direction.

Specifically, as described above, the recording portion 2300 includes the pull 13 provided at the front end of the recording head lifting and lowering frame 28 in the front-rear direction. The recording portion 2300 is supported so as to be movable in the front-rear direction with respect to the body frame 200. The pull 13 is disposed in the internal space (the region E) surrounded by the front door frame 120 of the front door 100 on the front side of the upper horizontal column 201 of the body frame 200. In other words, a position of at least a part of the pull 13 in the front-rear direction is the same as the position of the front door frame 120 of the front door 100 in a closed state in the front-rear direction. That is, when viewed along a line of sight in the left-right direction, the front door frame 120 of the front door 100 and the pull 13 at least partially overlap each other.

As described above, the scanner unit 11 includes the handle 402 provided at a front end of the scanner unit 11 in the front-rear direction. The handle 402 is disposed in the internal space (the region E) surrounded by the front door frame 120 of the front door 100 on the front side of the upper horizontal column 201 of the body frame 200.

As the internal space (region E) corresponding to the thickness of the front door frame 120 of the front door 100 in the front-rear direction is formed as described above, it is possible to reduce the front-back dimension of the apparatus.

The configuration of the front door 100 will be described in more detail with reference to FIG. 19. The front door 100 includes the transparent cover 110, the front door frame 120 that forms the periphery of the transparent cover 110, a gas spring 130 that assists with opening and closing, an upper hinge 140, and a hanging strap 150.

The front door frame 120 of the front door 100 has a design using two coating colors. The front door frame 120 includes a first frame 121 and a second frame 122. The first frame 121 is coated after a plurality of components are welded and fastened in a quadrangular shape. The second frame 122 is coated in a color different from that of the first frame 121 after a plurality of components are welded and fastened in a quadrangular shape. The front door frame 120 is formed by fastening the first frame 121 and the second frame 122 with screws after coating. The first frame 121 and the second frame 122 including the plurality of components are coated after welding in order to provide rigidity when assembled in the quadrangular shape.

The transparent cover 110 is bonded and fixed to the front end side of the front door frame 120 in the front-rear direction with an adhesive. Further, the gas spring 130, the upper hinge 140, and the hanging strap 150 are attached to predetermined positions on the front door frame 120.

<Opening and Closing of Front Door>

The upper hinge 140 is attached to an upper end of the front door 100, and the upper hinge 140 is attached to the upper horizontal column 201 of the body frame 200. The front door 100 can be opened and closed by rotating around the upper hinge 140. In this manner, the front door 100 is supported by the body frame 200 in an openable and closable manner.

Figure 20A:
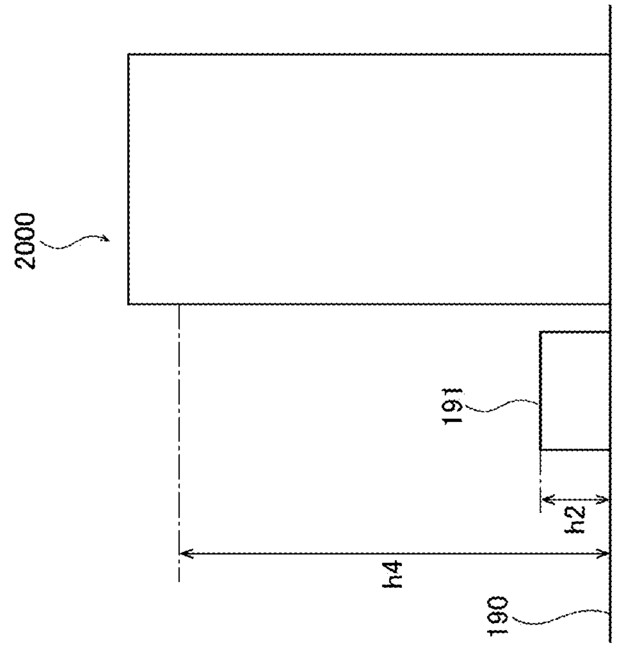
FIGS. 20A and 20B are views illustrating a state in which the front door of the print module is opened upward.
Figure 20B:
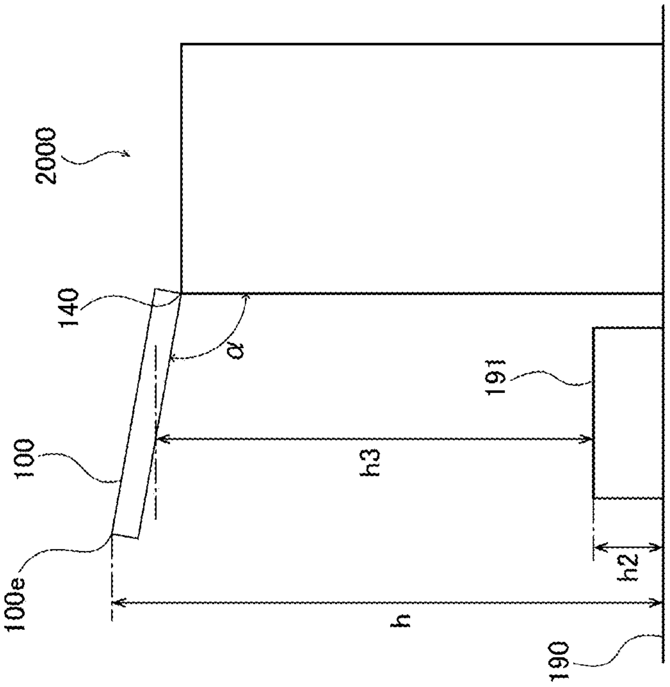
Figure 21:
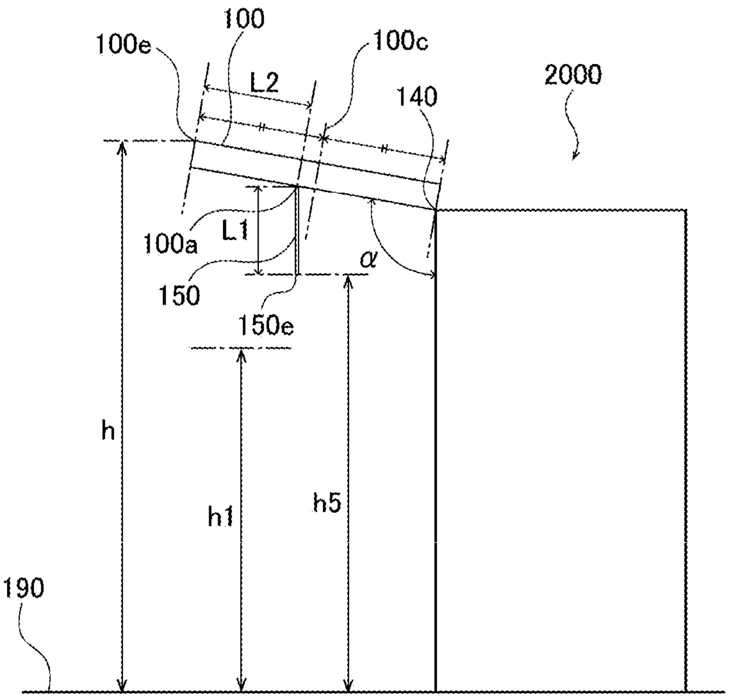
FIG. 21 is a view for describing a hanging strap of the front door opened upward.

An opening and closing operation of the front door 100 of the print module 2000 will be described with reference to FIGS. 3, 20A, 20B, and 21. FIGS. 20A and 20B are views illustrating a state in which the front door of the print module is opened upward. FIG. 21 is a view for describing the hanging strap of the front door opened upward.

The front door 100 covering the recording portion 2300 of the print module 2000 is opened upward at an upper end base point of the print module 2000 as illustrated in FIG. 3. The front door 100 includes a lever (not illustrated) for releasing a latch at the center of a lower side of the front door 100. When the lever is gripped to release the latch, the front door 100 is opened upward by the upper hinge 140, abuts on a stopper (not illustrated) provided at an open position by being assisted in an opening direction by the gas spring 130, and is kept open.

In a case where the front door 100 is not opened upward but is double hinged doors in the left-right direction, after the recording portion is pulled out to the front side from the print module at the time of replacing the recording head, a sufficient space cannot be secured for the operator to move to the left side of the recording portion and perform the operation, as a result of which it is difficult for the operator to perform the operation. Therefore, the front door 100 can be opened upward. In addition, since the image forming apparatus according to the present embodiment is formed by connecting a plurality of modules having different functions, it is necessary to continuously access the plurality of modules when an error or a jam occurs and the paper sheet remains inside the body. In such a case, the front door 100 can be opened upward from the viewpoint of not hindering horizontal movement of the print module to an adjacent module.

That is, when the front door 100 is opened upward, the opened front door does not hinder the horizontal movement of the print module 2000 to the adjacent module at the time of jam recovery spanning the plurality of modules. In addition, when replacing the recording head 10, it is easy to access a side surface of the recording portion 2300 pulled out to the front, so that the replacement can be easily performed. In addition, as the transparent cover 110 is provided in the front door 100 that is opened upward, even when the front door 100 is opened, light from a ceiling passes through the transparent cover 110 and illuminates the inside of the apparatus, so that the inside of the apparatus is easily viewed.

The maximum opening angle α when the front door 100 is opened upward around the upper end is set as follows. Here, a height of the image forming apparatus in the vertical direction from an installation surface 190 of the image forming apparatus to a free end 100*e*, which is a lower end of the front door 100, in a state in which the front door 100 is opened to the maximum opening angle is h. A lower limit height of the operator is h1 (for example, 1470 mm), and an upper limit height of the operator is h3 (for example, 1970 mm). A predetermined height of a workbench 191 for the operator with the lower limit height h1 is h2 (for example, 320 mm). Further, a height h4 illustrated in FIG. 20A is a height (eye height) to the eye of the operator with the lower limit height h1 standing on the workbench 191, and the height h2 of the workbench 191 is set such that the height h4 is a predetermined height (for example, 1670 mm). The opening angle α of the front door 100 is set to an opening angle α at which the height h to the free end 100*e* of the front door 100 in the vertical direction is higher than a height h3+h2 in the vertical direction when the operator with the upper limit height h3 stands on the workbench 191 with the predetermined height h2 for the operator with the lower limit height h1.

Specifically, the opening angle α of the front door 100 around the upper end is set to 100±10°. That is, the maximum opening angle α of the front door 100 falls within a range of 90 degrees to 110 degrees.

In order for a short person with the lower limit height h1 to access the maintenance portion 2600, it is necessary to stand on the workbench 191 having the height h2 as illustrated in FIG. 20A. In addition, even when a tall person with the upper limit height h3 stands on the workbench 191, the head needs to be prevented from hitting the front door 100 that is opened upward (FIG. 20B). The opening angle α around the upper end of the front door 100 is set from such a human scale viewpoint.

However, in a state in which the front door 100 is opened at an opening angle of 100°, a short person cannot close the front door 100 because the short person cannot reach the distal end (free end 100*e*) of the front door 100. Therefore, as illustrated in FIG. 21, the front door 100 includes the hanging strap 150 for the operator to hold when closing the front door 100. The hanging strap 150 is attached to the inner side of the front door 100. As described above, the hanging strap 150 is provided on the inner side of the front door 100, and the operator first pulls the hanging strap 150 with one hand to lower the front door 100 and then holds the distal end portion of the front door 100 with the other hand to close the front door 100.

In addition, in a case where the hanging strap 150 is excessively long or an attachment position of the hanging strap 150 is excessively close to a distal end side of the front door 100, the hanging strap 150 sticks out of the front door 100 when the front door 100 is closed, which impairs appearance. On the other hand, in a case where the hanging strap 150 is excessively short, a hand of a short person does not reach the hanging strap 150, and thus, the front door 100 cannot be closed. In addition, in a case where the attachment position of the hanging strap 150 is excessively close to a base side of the front door 100, the front door 100 may hit the operator when the front door 100 is closed.

From these viewpoints, in the front door 100 that is opened upward at the upper end base point of the print module 2000, the hanging strap 150 is attached at a position more adjacent to the free end than to a central portion 100*c* between the upper end (upper hinge 140) serving as a rotation fulcrum of the front door 100 and the free end 100*e*.

A total length L1 of the hanging strap 150 is set to be smaller than a length L2 from the attachment position 100*a* of the hanging strap 150 on the front door 100 to the free end 100*e* of the front door 100.

In addition, a height h5 from the installation surface 190 of the image forming apparatus to a lower end 150*e* of the hanging strap 150 in a state in which the front door 100 is opened at the maximum opening angle α is equal to or smaller than a set value that can be reached by the hand of the operator with the lower limit height h1.

Specifically, the upper limit height h5 of the hanging strap 150 is set to 1700 mm, and the attachment position 100*a* of the hanging strap 150 is set to 360 mm from the distal end (free end 100*e*) of the front door 100 in the front-rear direction. As a result, when the operator with the lower limit height h1 closes the front door 100, an angle of an arm at the time of hooking the second finger on the hanging strap 150 becomes about 160°, and the operator with the lower limit height h1 can be outside a rotation locus of the front door 100, so that the front door 100 can be avoided from hitting the operator even when the operator with the lower limit height h1 closes the front door 100.

Note that the image forming apparatus according to the present embodiment is required to have an interlock and a door lock from the viewpoint of safety, and has a specification in which the front door cannot be unlatched and thus cannot be opened even when the latch lever is gripped during operation of the body.

According to the present embodiment, since the front door 100 provided on the front surface of the image forming apparatus is opened upward, when maintenance work for the image forming apparatus is performed by opening the front door 100, a limitation on a work space by the opened front door 100 can be reduced. Therefore, it is possible to provide an image forming apparatus with improved operability.

As described above, the recording portion, the pull of the recording portion, the middle horizontal column, the maintenance portion, the reading portion, the conveyance belt, and the like are visually recognized through the transparent cover 110 in a state in which the front door 100 is closed. For each element, only a part of the element may be visually recognized, or the entire element may be visually recognized. In addition, among the above elements, some elements (for example, the reading portion) do not have to be visually recognized. The transparent cover 110 is disposed on the front door 100 that is opened upward and covers the front surface of the apparatus. Therefore, a range in which the operating state can be visually checked can be widened as compared with the double hinged door configuration. As a result, it is possible to provide an image forming apparatus with improved operability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-170078, filed Sep. 29, 2023, which is hereby incorporated by reference herein in its entirety.

What is claimed is:

1. An image forming apparatus comprising:

a recording portion configured to eject ink onto a sheet to form an image;

a conveyance portion facing the recording portion in a vertical direction and configured to convey the sheet in a first direction orthogonal to the vertical direction;

a body frame configured to support the recording portion and the conveyance portion, the body frame including a first support column and a second support column disposed respectively on both sides of the body frame in the first direction, each of the first support column and the second support column extending in the vertical direction;

a maintenance portion configured to perform maintenance of the recording portion, the maintenance portion being supported by the body frame and disposed between the recording portion and the first support column in the first direction;

a reading portion configured to read the image on the sheet, the reading portion being supported by the body frame and disposed between the recording portion and the second support column in the first direction; and an exterior cover disposed on a front side of the recording portion in a front-rear direction orthogonal to the vertical direction and the first direction and attached to the body frame so as to form a front exterior, and configured to rotate around a rotation axis on an upper end side of the exterior cover to be opened and closed, the exterior cover-including:

a transparent cover formed of a transparent material; and a cover frame disposed on at least part of a periphery of the transparent cover, the cover frame including:
a first cover frame portion facing the first support column of the body frame; and
a second cover frame portion facing the second support column of the body frame,
wherein the transparent cover spans from the first cover frame portion to the second cover frame portion,
wherein the recording portion is disposed between the first support column and the second support column in the first direction.

2. The image forming apparatus according to claim 1, wherein at least part of the recording portion, at least part of the maintenance portion, and at least part of the reading portion are visually recognized through the transparent cover in a state in which the exterior cover is closed.

3. The image forming apparatus according to claim 1, wherein at least part of the recording portion is visually recognized through the transparent cover in a state in which the exterior cover is closed.

4. The image forming apparatus according to claim 1, wherein:
the body frame includes a third support column connecting an upper end of the first support column and an upper end of the second support column and extending in the first direction,
the recording portion is disposed below the third support column, and
the exterior cover is disposed to span at least from the third support column of the body frame to the conveyance portion in the vertical direction.

5. The image forming apparatus according to claim 1, wherein:
the body frame includes a third support column connecting the first support column and the second support column and extending in the first direction, and the recording portion is disposed above the third support column.

6. The image forming apparatus according to claim 5, wherein:
a thickness of the cover frame in the front-rear direction is larger than a thickness of the transparent cover in the front-rear direction,
the transparent cover is provided on a front side of the cover frame in the front-rear direction,
the third support column includes a protruding portion protruding forward in the front-rear direction, and
at least part of the protruding portion is disposed at a same position as the cover frame in the front-rear direction in a state in which the exterior cover is closed.

7. The image forming apparatus according to claim 6, wherein the recording portion is attached to the protruding portion of the third support column and supported by the body frame.

8. The image forming apparatus according to claim 7, wherein at least part of the recording portion and at least part of the third support column are visually recognized through the transparent cover in a state in which the exterior cover is closed.

9. The image forming apparatus according to claim 1, wherein:
a thickness of the cover frame in the front-rear direction is larger than a thickness of the transparent cover in the front-rear direction, and
the transparent cover is provided on a front side of the cover frame in the front-rear direction.

10. The image forming apparatus according to claim 9, wherein:
the recording portion is configured to be movable in the front-rear direction with respect to the body frame,
the recording portion includes a handle provided at a front end of the recording portion in the front-rear direction, and
at least part of the handle of the recording portion is disposed at a same position as the cover frame in the front-rear direction in a state in which the exterior cover is closed.

11. The image forming apparatus according to claim 10, wherein the handle of the recording portion is visually recognized through the transparent cover in a state in which the exterior cover is closed.

12. The image forming apparatus according to claim 9, wherein:
the reading portion is configured to be movable with respect to the body frame,
the reading portion includes a handle provided at a front end of the reading portion in the front-rear direction and configured to move the reading portion, and
at least part of the handle of the reading portion is disposed at a same position as the cover frame in the front-rear direction in a state in which the exterior cover is closed.

13. The image forming apparatus according to claim 12, wherein the handle of the reading portion is visually recognized through the transparent cover in a state in which the exterior cover is closed.

14. The image forming apparatus according to claim 1, further comprising a gas spring configured to assist with rotation of the exterior cover.

15. The image forming apparatus according to claim 1, wherein a maximum opening angle of the exterior cover falls within a range of 90 degrees to 110 degrees.

16. The image forming apparatus according to claim 1, further comprising:
a hanging strap attached to an inner side of the exterior cover and configured to be gripped by an operator when closing the exterior cover,
wherein the hanging strap is attached at a position more adjacent to a free end of the exterior cover than to a central portion between an upper end serving as a rotation fulcrum of the exterior cover and the free end.

17. The image forming apparatus according to claim 16, wherein a total length of the hanging strap is smaller than a length from an attachment position of the hanging strap on the exterior cover to the free end of the exterior cover.

18. The image forming apparatus according to claim 16, wherein a height from an installation surface of the image forming apparatus to a lower end of the hanging strap, in a state in which the exterior cover is opened at a maximum opening angle is, not greater than 1700 mm.

19. The image forming apparatus according to claim 1, wherein:
the conveyance portion includes a conveyance belt configured to suck and convey the sheet, and
the conveyance belt has a color with a high contrast ratio to the sheet.

20. The image forming apparatus according to claim 1, further comprising:
a first module including the recording portion and the conveyance portion; and
a second module connected adjacent to the first module in the first direction.

21. An image forming apparatus comprising:

a recording portion configured to eject ink onto a sheet to form an image;

a conveyance portion facing the recording portion in a vertical direction and configured to convey the sheet in a first direction orthogonal to the vertical direction;

a body frame configured to support the recording portion and the conveyance portion; and an exterior cover disposed on a front side of the recording portion in a front-rear direction orthogonal to the vertical direction and the first direction and attached to the body frame so as to form a front exterior, and configured to rotate around a rotation axis on an upper end side of the exterior cover to be opened and closed, the exterior cover including:

a transparent cover formed of a transparent material; and a cover frame disposed on at least part of a periphery of the transparent cover, wherein a thickness of the cover frame in the front-rear direction is larger than a thickness of the transparent cover in the front-rear direction, and wherein the transparent cover is provided on a front side of the cover frame in the front-rear direction, wherein the recording portion is configured to be movable in the front-rear direction with respect to the body frame, wherein the recording portion includes a handle provided at a front end of the recording portion in the front-rear direction, and wherein at least part of the handle of the recording portion is disposed at a same position as the cover frame in the front-rear direction in a state in which the exterior cover is closed.

22. The image forming apparatus according to claim 21, wherein:

the body frame includes a first support column and a second support column disposed respectively on both sides of t the body frame in the first direction, each of the first support column and the second support column extending in the vertical direction, the recording portion is disposed between the first support column and the second support column in the first direction, the cover frame includes:

a first cover frame portion facing the first support column of the body frame; and a second cover frame portion facing the second support column of the body frame, and the transparent cover spans from the first cover frame portion to the second cover frame portion.

23. The image forming apparatus according to claim 22, further comprising:

a maintenance portion configured to perform maintenance of the recording portion; and a reading portion configured to read the image on the sheet, wherein the maintenance portion is supported by the body frame and is disposed between the recording portion and the first support column in the first direction, and the reading portion is supported by the body frame and is disposed between the recording portion and the second support column in the first direction.

24. The image forming apparatus according to claim 23, wherein at least part of the recording portion, at least part of the maintenance portion, and at least part of the reading portion are visually recognized through the transparent cover in a state in which the exterior cover is closed.

25. The image forming apparatus according to claim 21, wherein at least part of the recording portion is visually recognized through the transparent cover in a state in which the exterior cover is closed.

26. The image forming apparatus according to claim 22, wherein:

the body frame includes a third support column connecting an upper end of the first support column and an upper end of the second support column and extending in the first direction, the recording portion is disposed below the third support column, and the exterior cover is disposed to span at least from the third support column of the body frame to the conveyance portion in the vertical direction.

27. The image forming apparatus according to claim 22, wherein:

the body frame includes a third support column connecting the first support column and the second support column and extending in the first direction, and the recording portion is disposed above the third support column.

28. The image forming apparatus according to claim 27, wherein:

the third support column includes a protruding portion protruding forward in the front-rear direction, and at least part of the protruding portion is disposed at a same position as the cover frame in the front-rear direction in a state in which the exterior cover is closed.

29. The image forming apparatus according to claim 28, wherein the recording portion is attached to the protruding portion of the third support column and supported by the body frame.

30. The image forming apparatus according to claim 29, wherein at least part of the recording portion and at least part of the third support column are visually recognized through the transparent cover in a state in which the exterior cover is closed.

31. The image forming apparatus according to claim 21, wherein the handle of the recording portion is visually recognized through the transparent cover in a state in which the exterior cover is closed.

32. The image forming apparatus according to claim 21, further comprising:

a reading portion configured to read the image on the sheet, wherein the reading portion is configured to be movable with respect to the body frame, and wherein the reading portion includes a handle provided at a front end of the reading portion in the front-rear direction and configured to move the reading portion, and wherein at least part of the handle of the reading portion is disposed at a same position as the cover frame in the front-rear direction in a state in which the exterior cover is closed.

33. The image forming apparatus according to claim 32, wherein the handle of the reading portion is visually recognized through the transparent cover in a state in which the exterior cover is closed.

34. The image forming apparatus according to claim 21, further comprising a gas spring configured to assist with rotation of the exterior cover.

35. The image forming apparatus according to claim 21, wherein a maximum opening angle of the exterior cover falls within a range of 90 degrees to 110 degrees.

36. The image forming apparatus according to claim 21, further comprising:

a hanging strap attached to an inner side of the exterior cover and configured to be gripped by an operator when closing the exterior cover, wherein the hanging strap is attached at a position more adjacent to a free end of the exterior cover than to a central portion between an upper end serving as a rotation fulcrum of the exterior cover and the free end.

37. The image forming apparatus according to claim 36, wherein a total length of the hanging strap is smaller than a length from an attachment position of the hanging strap on the exterior cover to the free end of the exterior cover.

38. The image forming apparatus according to claim 36, wherein a height from an installation surface of the image forming apparatus to a lower end of the hanging strap, in a state in which the exterior cover is opened at a maximum opening angle is, not greater than 1700 mm.

39. The image forming apparatus according to claim 21, wherein:

the conveyance portion includes a conveyance belt configured to suck and convey the sheet, and the conveyance belt has a color with a high contrast ratio to the sheet.

40. The image forming apparatus according to claim 21, further comprising:

a first module including the recording portion and the conveyance portion; and a second module connected adjacent to the first module in the first direction.

* * * * *